United States Patent [19]
Suzuki et al.

[11] Patent Number: 5,736,982
[45] Date of Patent: Apr. 7, 1998

[54] VIRTUAL SPACE APPARATUS WITH AVATARS AND SPEECH

[75] Inventors: Gen Suzuki, Fujisawa; Shohei Sugawara, Yokosuka; Hiroya Tanigawa, Miura; Machio Moriuchi, Yokohama; Yoshio Nagashima; Yasuhiro Nakajima, both of Yokosuka; Hiroyuki Arita, Tokyo; Yumi Murakami, Yokosuka, all of Japan

[73] Assignee: Nippon Telegraph and Telephone Corporation, Tokyo, Japan

[21] Appl. No.: 509,091

[22] Filed: Aug. 1, 1995

[30]  Foreign Application Priority Data

| Aug. 3, 1994 | [JP] | Japan | 6-182058 |
| Dec. 27, 1994 | [JP] | Japan | 6-325858 |
| Jan. 13, 1995 | [JP] | Japan | 7-004235 |
| Jun. 16, 1995 | [JP] | Japan | 7-150501 |
| Jul. 5, 1995 | [JP] | Japan | 7-169919 |

[51] Int. Cl.[6] ............................................. G06F 3/00
[52] U.S. Cl. .............................. 345/330; 345/355
[58] Field of Search .......................... 395/326–358, 395/978; 364/516; 345/156, 326–358, 978; 381/173, 17

[56]  References Cited

U.S. PATENT DOCUMENTS

| 5,467,401 | 11/1995 | Nagamitsu et al. | 381/17 X |
| 5,469,511 | 11/1995 | Lewis et al. | 381/173 |
| 5,513,129 | 4/1996 | Bolas et al. | 345/156 |
| 5,598,478 | 1/1997 | Tanaka | 381/17 |
| 5,615,132 | 3/1997 | Horton et al. | 364/516 |
| 5,633,993 | 5/1997 | Redmann et al. | 395/978 X |

FOREIGN PATENT DOCUMENTS

| 0 6334 857 | 1/1995 | European Pat. Off. | H04L 29/06 |
| 0 659 006 | 6/1995 | European Pat. Off. | H04M 3/56 |
| 6-175942 | 6/1994 | Japan | G06F 13/00 |

OTHER PUBLICATIONS

Kobayashi et al., "Virtual Conference Room: A Metaphor for Multi-User Real-Time Conferencing Systems", IEEE, pp. 430–435, Jul. 1993.

Benford, "A Distributed Architecture for Large Collaborative Virtual Environments", IEEE, pp. 1–9, 1993.

Morishima et al., "Facial Expression Synthesis Based on Natural Voice for Virtual Face-to-Face Communication with Machine", IEEE, pp. 486–491, 1993.

Cohen et al., "Virtual Gain for Audio Windows", IEEE, pp. 85–91, 1993.

Wenzel et al., "A System for Three-dimensional Acoustic Visualization in a Virtual Environment Workstation", IEEE, pp. 329–337, 1990.

Cohen et al., "Augmented Audio Reality: Telepresence/VR Hybrid Acoustic Environments", IEEE, pp. 361–364, Jul. 1993.

(List continued on next page.)

*Primary Examiner*—John E. Breene
*Attorney, Agent, or Firm*—Pollock, Vande Sande & Priddy

[57]  ABSTRACT

A plurality of terminals are connected to a server via a communication network and share a predetermined common virtual space. The terminals each send to the server the position coordinates of the viewing point and direction of eyes of its user in the virtual space, and the visual field image viewed from that viewing point is displayed on a display. Based on the position coordinates and direction of eyes of the avatar each of the other terminals received from each of the other terminals via the server, each terminal generates an avatar image in the specified direction and at the specified position and displays it in the visual field. The server is always supplied with the latest position information of the avatar from every terminal and, when the distance between two arbitrary avatars becomes smaller than a threshold value, connects speech channels of the two terminals corresponding to these avatars.

61 Claims, 23 Drawing Sheets

OTHER PUBLICATIONS

Carlsson C., et al., Dive –A Multi–User Virtual Reality System, *Institute of Electrical and Electronics Engineers*, pp. 394–400, Sep. 18, 1993.

Robinett W., Interactivity and individual viewpoint in shared virtual worlds: the big screen vs. networked personal displays, *Computer Graphics*, vol. 28, No. 2, pp. 127–130, May, 1994.

Fukuda, K., et al., Hypermedia personal computer communication system: Fujitsu Habitat, *Fujitsu Scientific and Technical Journal*, vol. 26, No. 3, pp. 197–206, Oct., 1990.

Benford, S., et al., "Supporting Cooperative Work in Virtual Environments," *The Computer Journal*, vol. 37, No. 8, 1994, pp. 653–667.

Ishii, Hiroshi, et al., "Iterative Design of Seamless Collaboration Media," *Communications of the ACM*, vol. 37, No. 8, Aug. 1994, pp. 83–97.

Caudell, T.P., et al., "Neural Modeling of Face Animation for Telecommuting in Virtual Reality," *Proceedings of the Virtual Reality Annual International Symposium*, Seattle, Sep. 18, 1993, pp. 478–485.

| AVATAR IDENTIFIER : AID | AID$_1$ | AID$_2$ | AID$_3$ |
|---|---|---|---|
| CHANGE FLAG : CFLG | 1 | 0 | 0 |
| STATE FLAG : SFLG | F$_1$ | F$_2$ | F$_3$ |
| COORDINATE VALUE : COV (x, y, z) | x$_1$, y$_1$, z$_1$ | x$_2$, y$_2$, z$_2$ | x$_3$, y$_3$, z$_3$ |
| DIRECTION OF EYE : ED γ | γ$_1$ | γ$_2$ | γ$_3$ |

VIRTUAL SPACE APPARATUS WITH AVATARS AND SPEECH

BACKGROUND OF THE INVENTION

The present invention relates to a virtual space display method which allows user terminals connected to a communication network to freely move their avatars to desired positions in a shared virtual space and causes the user terminals to display images in their fields of vision in the virtual space. The invention also pertains to a virtual space sharing apparatus using the above-mentioned virtual space display method.

As virtual space systems wherein a plurality of user terminals enter a shared virtual space via a communication network from their terminals connected thereto and communicate or collaborate with each other, there have been proposed, for example, a multi-user distributed, real-time multimedia conference system by Nihon IBM Co., Ltd. (Information Processing Society of Japan, 47th National Conference 2E-5, 1993), SIMNET by DARPA of the United States Department of Defense, a communication game "HABITAT" of which service is now being offered by Fujitsu LTD. on a personal computer communication network, and a networked virtual reality system by Nippon Electric Co., Ltd. (Shinohara, "Three Dimensional Configuration Control," Information Processing Society of Japan, Kyushu Symposium, December 1991).

In these conventional virtual space display systems, the virtual space is displayed as a user interface of a specific application such as a combat simulation, electronic mail system or electronic conference system. Users are allowed to move their avatars in the virtual space, but since video images that the users observe on their terminal displays are video images captured by their avatars in the virtual space that is observed from the outside thereof, the virtual space has a defect that the users cannot fully feel a sense of real existence in the space. Moreover, when the user avatars meet and talk with each other in the virtual space, their voices are merely transmitted and received between them; hence, also from the auditory point of view, the users cannot feel totally immersed in the virtual space. Also from the visual point of view, the virtual space lacks a sense of real existence or reality since the avatars of the users are all displayed in the same size.

SUMMARY OF THE INVENTION

A first object of the present invention is to provide a virtual space display method which gives users a sense of real existence in the virtual space and a virtual space sharing apparatus utilizing the method.

A second object of the present invention is to provide a virtual space display method which lends realism to the virtual space auditorily and/or visually and a virtual space sharing apparatus utilizing the method.

According to its first aspect, the present invention is directed to a virtual space display method and a virtual space sharing apparatus for use with a virtual space system in which a plurality of user terminals connected to a communication network share a predetermined corrosion virtual space and create and display visual field images which change as avatars of the users move in the virtual space. Each user terminal generates, by input control means, signals which respectively select and specify the position and direction of eyes of the avatar of the terminal user in the virtual space and produces, by visual field image producing means, a visual field image captured in the specified direction of eyes of the avatar from its position specified as a viewing point in the virtual space. Position information send/receive means sends the specified position and direction of eyes of the avatar as position information to the communication network and receives therefrom position information sent thereto from other terminals. Then, through utilization of the received position information, the terminal produces, by avatar image producing means, avatar images of the users of the other terminals in the visual field image at the positions defined by the received position information and displays, on display means, a combined image including the visual field image and the avatar images.

According to a second aspect of the present invention, in the method and apparatus of the first aspect of the invention, a group of avatars which satisfy a conversation enable condition between them is searched and the terminals of the avatars in the same group are each supplied with voices of the other avatars mixed by common mixer means.

According to a third aspect of the present invention, in the method and apparatus of the first aspect of the invention, speech data of all avatars are mixed by mixer means to produce an environment sound for supply to each avatar.

According to a fourth aspect of the present invention, each user terminal uses the relationship between the position information of its avatar and that of the other avatars to determine the speech quality of the other avatars, then controls voices of the latter to have the thus determined quality, thereafter mixing them.

According to a fifth aspect of the present invention, each user terminal uses the relationship between position information of its avatar and that of the other avatars to determine the image quality of the latter, then requests the other terminals or a server for video images of the other avatars, each having the thus determined quality, and the other terminals or server sends the requested images of the avatars to the requesting terminal after converting them into video images of the specified quality.

DESCRIPTION OF THE PREFERRED EMBODIMENTS

In the present invention, a plurality of terminals connected via a communication network share a virtual space and are allowed to freely move avatars of terminal users in the virtual space and display on their terminal displays the scenes that the avatars are observing in the virtual space. Images representing the avatars of the users (which may be symbols, illustrations of the users or illustrations with users' facial video images embedded therein and which will hereinafter be referred to simply as avatar images) are formed at the positions of the avatars in the virtual space. Accordingly, the scene in the virtual space that is displayed on a display unit of each user terminal contains avatar images of other users in the field of vision of the avatar of each user in the virtual space. The virtual space display system of the present invention can also be designed so that the users receive predetermined services such as various entertainments, shopping and various pieces of information, but the system of the present invention is configured, in particular, to allow the avatar of each user to talk with other avatars whom it happens to meet in the virtual space.

Figure 1A:
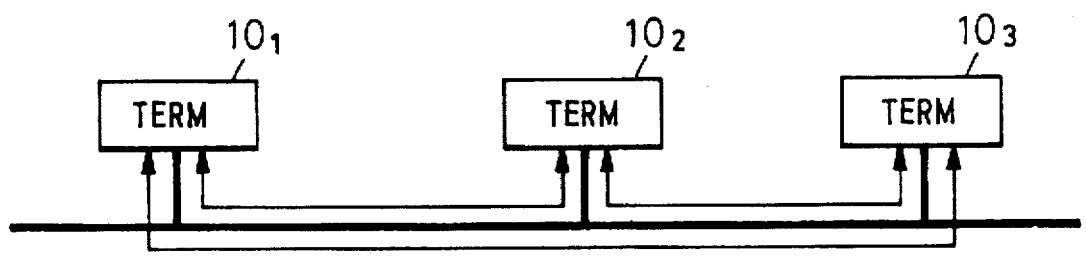
FIG. 1A is a diagram schematically showing an example of a distributed connection type system to which the present invention is applied.
Figure 1B:
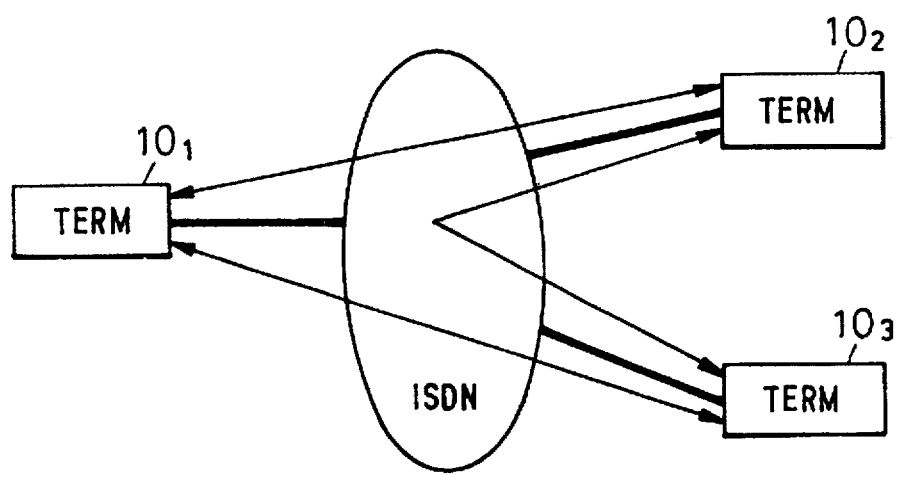
FIG. 1B is a diagram schematically showing another example of the distributed connection type system to which the present invention is applied.

The system of the present invention can be designed as either a distributed connection type system or a centralized one. In the distributed connection type system, as shown in FIG. 1A, a plurality of terminals $10_1$, $10_2$ and $10_3$ connected to the thick-lined communication network such as a LAN (local area network) are each adapted to form a common virtual space and to send and receive data to and from the other terminals as indicated by the thin-lined arrows. Each terminal sends data representing the position of the avatar of the user in the virtual space and data representing the direction of eyes of the avatar (hereinafter referred to as position information) to all the other terminals at regular time intervals or when the position or direction data changes. Upon receiving the position data and direction-of-eye data from other terminals, each terminal checks the data to see if the avatars of the other terminal users exist in the visual field of its avatar, and if so, the terminal displays the avatar images of the other terminal users at the positions specified by the position data received. Moreover, as explained with reference to an embodiment described later on, each user sends his voice or speech from his terminal to all the other terminals, and as described later in respect of another embodiment, if necessary, the user sends, for example, his facial video to other terminals by request. FIG. 1B shows a distributed connection type system where the LAN includes ISDN.

Figure 2A:
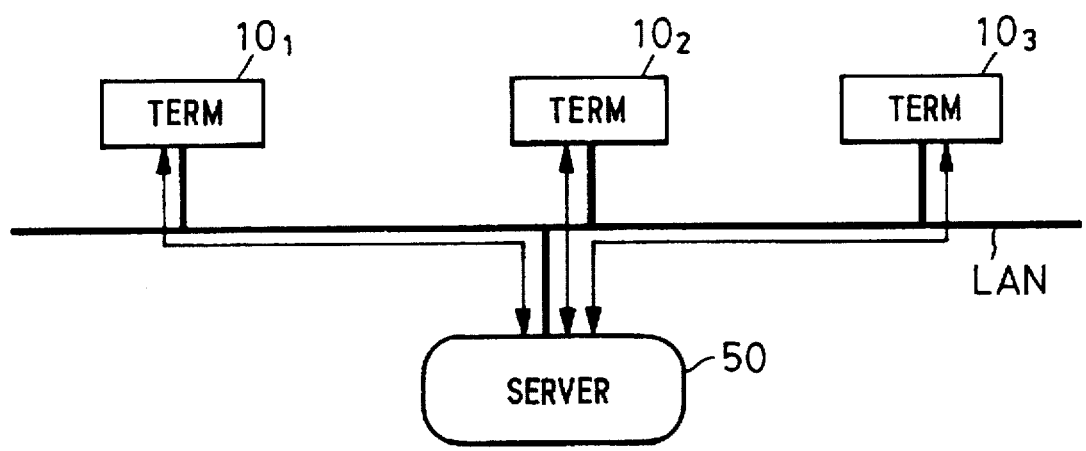
FIG. 2A is a diagram schematically showing an example of a centralized connection type system to which the present invention is applied.
Figure 2B:
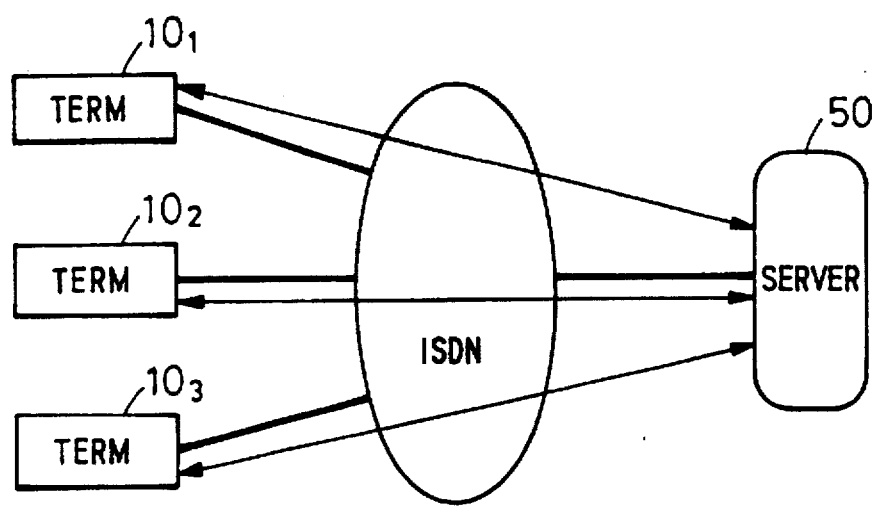
FIG. 2B is a diagram schematically showing another example of the centralized connection type system to which the present invention is applied.

In the centralized connection type system, as depicted in FIG. 2A, the terminals $10_1$, $10_2$ and $10_3$ are all connected to a server 50 via a communication network such as a LAN and perform two-way communication with the server 50 as indicated by the thin-lined arrows. In this instance, each terminal sends at least the position information of the avatar of its user to the server 50; the server 50 performs required processing on the basis of the position information received from each terminal and sends the processed position information to all the terminals $10_1$, $10_2$ and $10_3$. FIG. 2B shows the case where the terminals $10_1$, $10_2$ and $10_3$ are all connected to the server 50, for example, via ISDN.

First Embodiment

Figure 3:
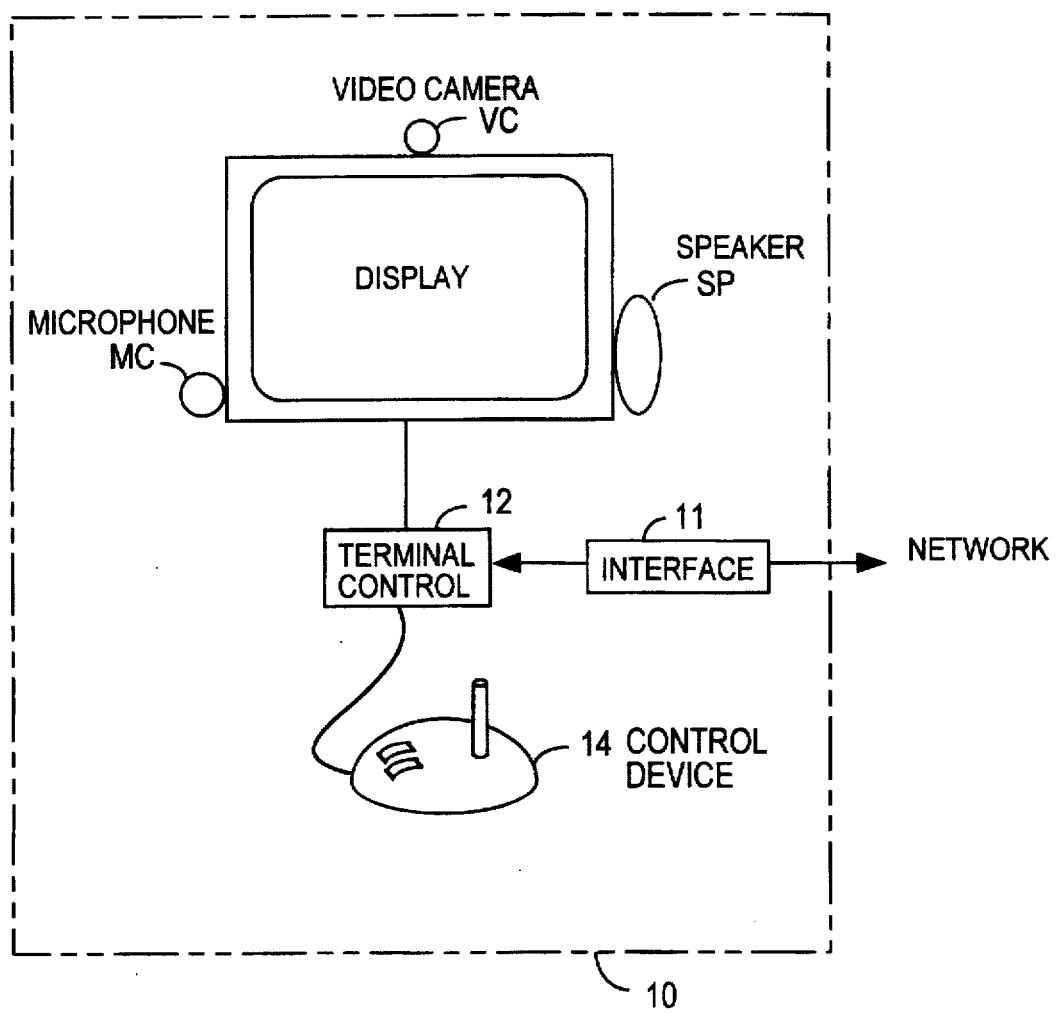
FIG. 3 is a block diagram illustrating the construction of a terminal according to a first embodiment of the present invention.

FIG. 3 schematically illustrates an example of the configuration of each terminal unit 10 which forms the virtual space sharing apparatus of the present invention for use in the centralized connection type system. The terminal unit 10 has a channel interface part 11 connected to a network (LAN, ISDN or the like), a terminal control device 12, a display 13, a control device 14, a speaker SP, a microphone MC and a video camera VC.

Figure 4A:
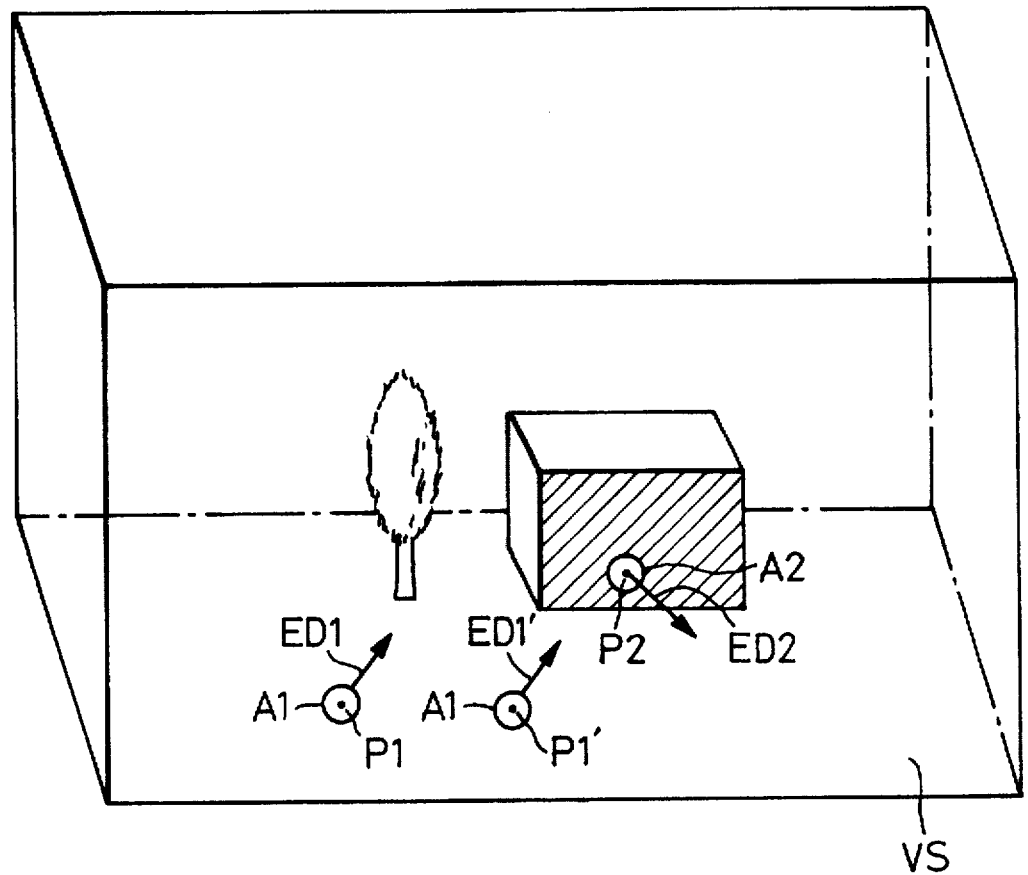
FIG. 4A is a perspective view for explaining a virtual space which is shared by terminals.
Figure 4B:
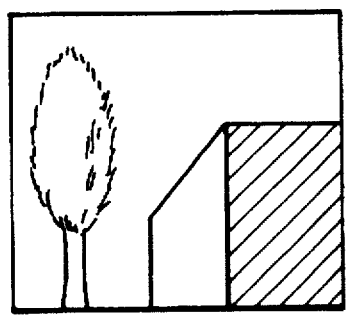
FIG. 4B is a diagram showing a visual field image at one viewing point in the virtual space depicted in FIG. 4A.
Figure 4C:
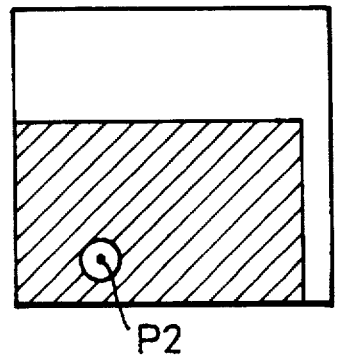
FIG. 4C is a diagram showing a visual field image at a viewing point shifted from that in FIG. 4B.

FIG. 4A schematically illustrates the architecture of a virtual space VS provided beforehand for the terminal control device 12 of the terminal unit $10_1$ of a user U1, positions P1 and P2 (given as coordinate values) of avatars A1 and A2 of users in the virtual space VS and the directions of eyes (indicated by the arrows ED1 and ED2) of the avatars A1 and A2. Moreover, position P1' indicates the position of the avatar A1 having moved thereto and the direction of eye at the position P1' is indicated by the arrow ED1'. On the other hand, FIG. 4B shows a visual field image that the avatar A1 observes in the direction ED1 from the position P1; this visual field image is displayed on the display 13 of the terminal unit $10_1$ of the user U1. FIG. 4C shows a visual field image that the avatar A1 in FIG. 4A observes at the position P1' after having moved thereto, the direction of its eyes being indicated by the arrow ED1'.

When the user U1 instructs, by a joystick or similar control device 14 of his terminal $10_1$, his avatar in the virtual space VS to move rightward from the position P1 to the position P1' as shown in FIG. 4A, the terminal control device 12 responds to the "move" instruction to display on the display 13 the visual field image in the virtual space VS viewed from the new position P1' (FIG. 4C) in place of the visual field image from the position P1 displayed until then (FIG. 4B), and the control device 12 sends the new position P1' from the interface 11 to the server 50 via the communication network NW. The avatar image A1 representing the user U1 in the virtual space VS is not displayed on the display 13 of the terminal $10_1$ of his own. In this embodiment, the avatar image A2 of the other user U2 is displayed in the visual field image viewed from the viewing point P1' (FIG. 4C).

Figure 5:
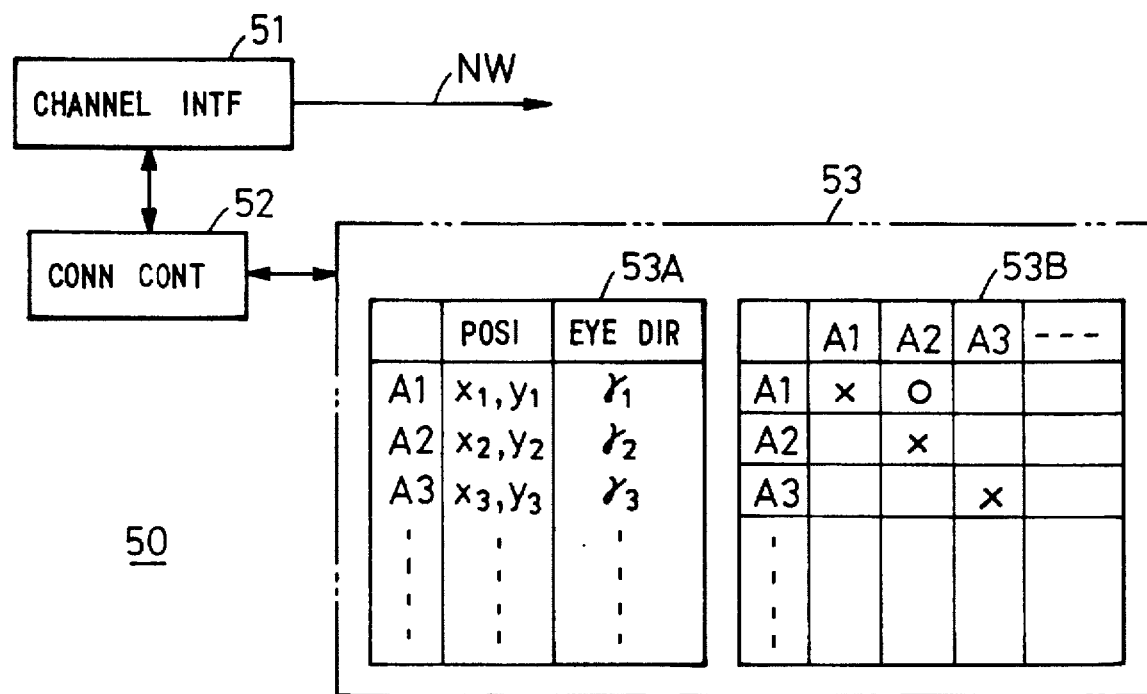
FIG. 5 is a block diagram illustrating an example of a server in the first embodiment.

The server 50 has, as shown in FIG. 5, a channel interface part 51, a connection control part 52 and a table memory 53. The channel interface part 51 is connected via the communication network NW to the terminal units $10_1$ and $10_2$, receives therefrom the position information of their avatars, that is, the viewing points P1 and P2 and directions of eyes ED1 and ED2 of the avatars A1 and A2, transmits the position information to all terminals except the transmitting one and controls audio and video channel connection between the terminals specified by the connection control part 52. The connection control part 52 writes the received position information, that is, the coordinates of the positions (the virtual space is three-dimensional and the position of each avatar is expressed by three-dimensional coordinates but will hereinafter be expressed by two-dimensional coordinates (x, y)) and the directions of eyes ED in a position information table 53A of the table memory 53 in correspondence with the respective terminals. According to the present invention, when the relationship between two arbitrary avatars satisfies a predetermined condition after the updating of the data stored in the memory 53, the terminals corresponding to the two avatars are connected via the channel interface part 51 to enable communication or conversation between the users of these terminals. The conversation enable condition consists of, for example, the distance between the avatars and the degree of eye-to-eye contact between them as described later with reference to other embodiments. The connection control part 52 calculates the distance d between the avatars A1 and A2, for example, in the table 53A by $d^2=(x_1-x_2)^2+(Y_1-Y_2)^2$, and when d<D (where D is a predetermined value) and the degree of eye-to-eye contact defined by the directions of eyes ED1 and ED2 of the avatars A1 and A2 satisfies a predetermined condition, the connection control part 52 instructs the channel interface part 51 to connect the channel between the terminals $10_1$ and $10_2$ corresponding to the avatars A1 and A2 and writes the state of connection (indicated by a white circle) of the avatars A1 and A2 in a state-of-connection table 53B.

The channel interface part 51 relays processed audio and video data between the terminals $10_1$ and $10_2$, that is, sends the data received from the terminal $10_1$ to the terminal $10_2$ and the data received from the latter to the former.

The terminal control part 12 of the terminal $10_1$ decodes the audio data received from the terminal $10_2$ via the channel interface part 51 and outputs the sound from the speaker SP, creates the avatar image at the position specified by the coordinate value $(x_2, Y_2)$ contained in the position information received from the terminal $10_2$ and outputs it to the display 13 in combination with the visual field image in the virtual space being currently displayed. Similarly, the terminal $10_2$ processes and outputs the audio and video data received from the terminal $10_1$.

Figure 6:
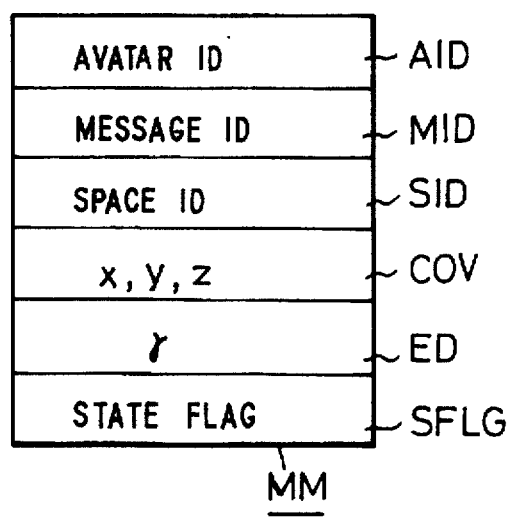
FIG. 6 is a diagram showing an example of the configuration of a message for transmission between a terminal and the server.

In the above, when the user of each terminal moves and/or turns his avatar in the virtual space, the position information from the terminal is sent as part of a "move" message MM of such a format as shown in FIG. 6.

The "move" message MM is composed of an avatar identifier AID, a message identifier MID, a space identifier SID, a coordinate value COV, the direction of eyes ED and a state flag SFLG. The avatar identifier AID is a pre-assigned unique number representing the terminal having sent the message. The message identifier MID is a predetermined number representing the message for sending position information based on the movement of the avatar. The coordinate value COV and the direction of eyes ED are a position coordinate value (x, y, z) and a direction-of-eyes value γ (vector) of the avatar in the virtual space, respectively. The state flag SFLG is a value indicating the state of the avatar (moving, communicating, selecting, or idle). In this case, the "selecting" state is used in a message for receiving a service, and a button value for selecting an item from a service menu by the control device 14 is used as the flag. The button value is a value indicating which button of an input device (a mouse or joystick) is being pressed. The "idle" state is the state in which the user is not using the terminal.

Figures 7, 8:
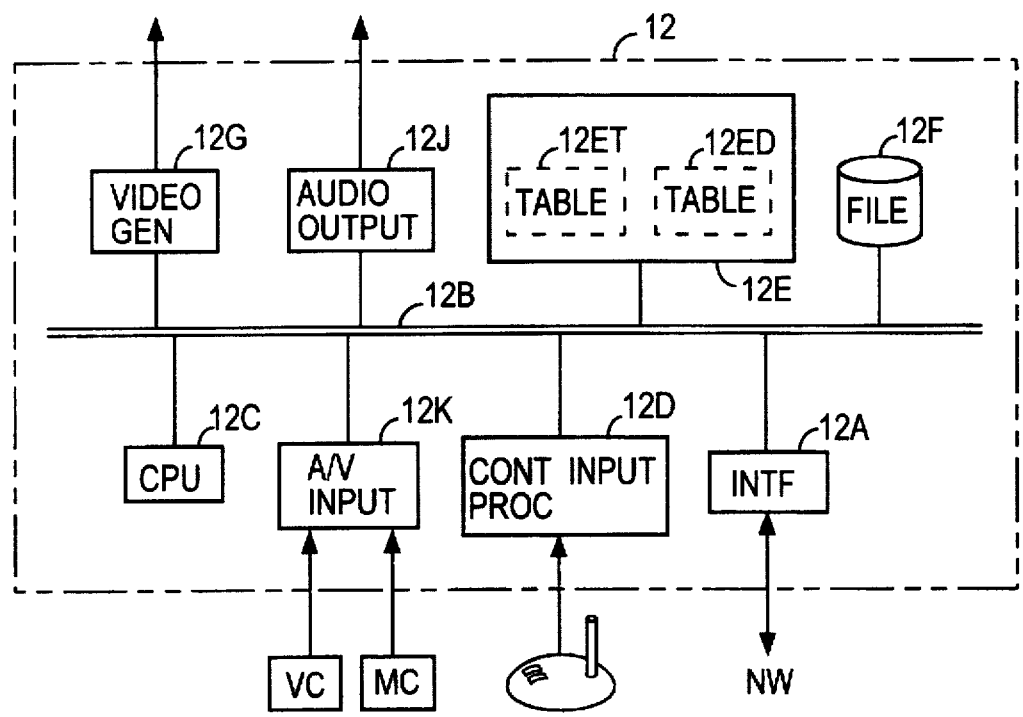
FIG. 7 is a block diagram illustrating an example of a terminal control part of the terminal shown in FIG. 3.
FIG. 8 is a table showing the configuration of data that is held in a management table memory in FIG. 7.

FIG. 7 illustrates in block form the configuration of the terminal control part 12 in each terminal unit 10 of FIG. 3 in a centralized connection type system. The terminal control part 12 comprises: a video image generating part 12G which generates a CG visual field image viewed in the specified direction of eyes from the specified coordinate position in the three-dimensional virtual space, for display on the display 13; a control input processing part 12D which receives the input from the control device 14 and processes it for conversion to the coordinate value and the button value; a communication interface 12A which performs processing for transmission and reception to and from the communication network NW; a file unit 12F which stores display data, virtual space image data, software and user data; a management table memory 12E; an audio output processing part 12J which receives audio data and provides an analog speech signal to the microphone MC; an audio/video input part 12K which performs digital processing of input speech from the microphone MC and a video signal from the video camera VC and provides them to the server 50; and a CPU 12C which controls the operation of the terminal control part 12. These components are interconnected via a bus 12B.

In the management table memory 12E, as shown in FIG. 8, there are stored the position coordinate COV and direction of eyes γ of the user's avatar inputted from the control input processing part 12D through the manipulation of the control device 14, the position coordinates COV and direction of eyes γ of other avatars, change flags CFLG and state flags SFLG received from the server 50 (or other terminals); these pieces of information are stored in correspondence with the respective avatar identifiers AID. The avatar identifier AID, the state flag SFLG, the coordinate value COV and the direction of eyes ED are the same as those used in the "move" message depicted in FIG. 6. When these pieces of data on avatars are updated, the change flag CFLG is set to "1." Now, a description will be given of the operation of the terminal control part 12 in the terminal $10_1$ of the user U1, for instance. The CPU 12C reads out of the management table memory 12E the position (x,y,z) and direction of eyes $γ_1$ corresponding to the identifier $AID_1$ of the avatar A1 of the user U1, instructs the video image generating part 12G to generate the visual field image observed in the direction of eyes $γ_1$ from the position (x,y,z) in the virtual space stored as data in the file unit 12F, detects other avatars present in that field of vision from their coordinate values stored in the table memory 12E, generates avatar images at the positions of the detected avatars and instructs the display 13 to display thereon the avatar images in combination with the visual field image. The avatar images that are displayed on the display 13 are, for example, video images of users' faces received from the server 50 and produced in sizes corresponding to the distances from the avatar A1 of the user U1 to the other avatars to be displayed.

The CPU 12C always monitors the change flag CFLG in the management table memory 12E and, upon detecting a change in the data stored corresponding to the avatar A1 of the user U1 (CFLG=1), instructs the video image generating part 12G to separately generate the visual field image in the virtual field to be displayed and the other avatar images to be contained therein and displays them on the display 13, thereafter resetting the change flag CFLG. When it is detected that the change flag of another avatar is "1," only its avatar image is updated on the basis of the updated coordinate position COV and direction of eyes γ, after which the change flag CFLG is reset.

While this embodiment has been described in respect of the centralized connection type system, the present invention is also applicable to the distributed connection type system. In such an instance, each terminal sends to all the other terminals the "move" message MM of the format of FIG. 6 which contains the position information on the avatar of said each terminal and, at the same time, writes the message into the management table memory 12E of the terminal control part 12 shown in FIG. 7. On the other hand, each terminal writes into the management table memory 12E the "move" messages MM of the same format received from the other terminals and, at the same time, forms and displays other avatar images, which are observed in the field of vision from the position of its user's avatar, at their specified positions in the visual field image. To implement the distributed connection type system, the terminal control part 12 of each terminal needs only to incorporate therein between the communication interface 12A and the bus 12B a part that corresponds to the channel interface part 51 of the server 50 in the centralized connection type system shown in FIG. 5. The functions of the connection control part 52 and the table memory 53 in FIG. 5 can be implemented by the CPU 12 and the management table memory 53 in FIG. 7, respectively.

Second Embodiment

In the above, a brief description has been given of the case of connecting the audio channel between two terminals when the distance d between avatars of their users in the virtual space is smaller than a predetermined valued; a description will be given of the conditions that enable conversation between such avatars and an embodiment of an apparatus which connects the speech channel between them on the basis of such conditions. The conditions are the distance between two avatars and their visual angles and directions of eyes.

Figure 9A:
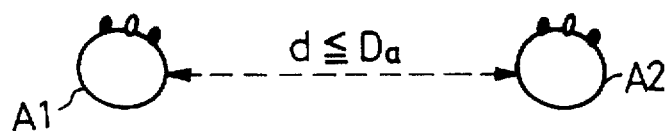
FIG. 9A is a diagram showing the relationship between avatars when a conversation enable condition is the distance between them in a second embodiment of the present invention.

(a) When the distance d between the avatars A1 and A2 given their position coordinates is equal to or smaller than a predetermined value Da as shown in FIG. 9A, the server 50 interconnects the terminals $10_1$ and $10_2$ corresponding to the avatars A1 and A2, enabling transmission and reception of speech between them. In the system like this, the direction of eyes is not taken into account.

Figure 9B:
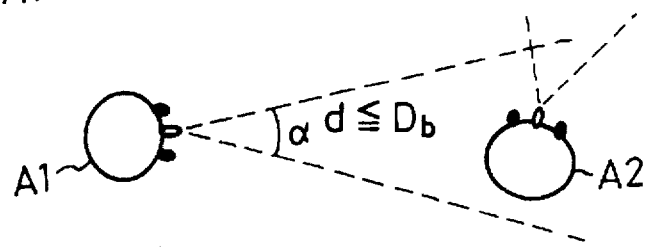
FIG. 9B is a diagram showing the relationship between avatars when the conversation enable condition is the field of vision.

(b) When the distance d between the avatars A1 and A2 is equal to or smaller than a predetermined value Db and at least one of the avatars is in the field of vision of the other avatar as shown in FIG. 9B, the server 50 interconnects the two corresponding terminals, enabling transmission and reception of speech between them. The visual angle α is a predetermined value. In the example FIG. 9B, the avatar A1 of the user U1 is not displayed on the display unit 13 of the terminal $10_2$ of the user U2 but the avatar A2 of the user U2 is displayed on the terminal display unit 13 of the user U1; hence, the avatar A1 can start conversation with the avatar A2 by calling to it.

Figure 9C:
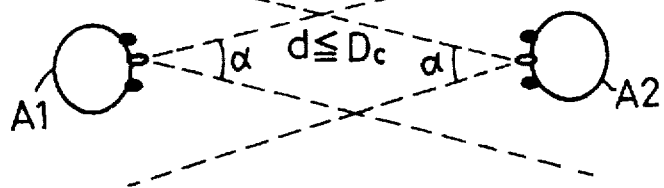
FIG. 9C is a diagram showing another example of the relationship between avatars when the conversation enable condition is their fields of vision.

(c) When the distance d between the avatars A1 and A2 is equal to or smaller than a predetermined value Dc and either of them is in the field of vision of the other as shown in FIG. 9C, the server interconnects the two corresponding terminals, enabling transmission and reception of speech between them. Incidentally, when the avatars of two terminal users are each in the field of vision of the other, it is assumed that they establish eye-to-eye contact.

Figure 9D:
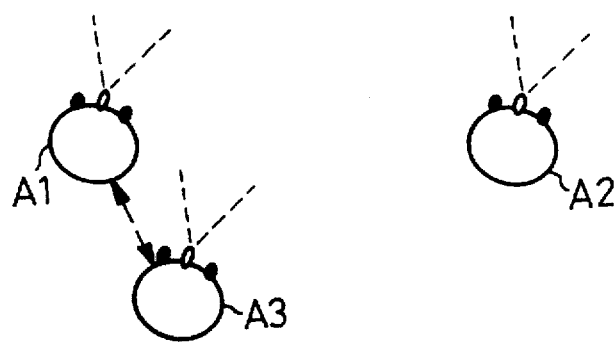
FIG. 9D is a diagram showing the relationship among three avatars when the conversation enable condition is the distance between them.

(d) In such a situation as shown in FIG. 9D wherein a third avatar A3 approaches one (A1, for example) of the avatars A1 and A2 engaged in conversation with each other in a system utilizing the above-mentioned condition (a) and a conversation enable condition (d≦Dd) is also satisfied between the avatars A1 and A3 as shown FIG. 9D, voices of the avatars A1 and A2 are sent to the terminal $10_3$ of the avatar A3 after being mixed, voices of the avatars A1 and A3 are sent to the terminal $10_2$ of the avatar A2 after being mixed and voices of the avatars A2 and A3 are sent to the terminal $10_1$ of the avatar A1 after being mixed so as to enable conversation among the avatars A1, A2 and A3 of the three terminal users.

Figure 9E:
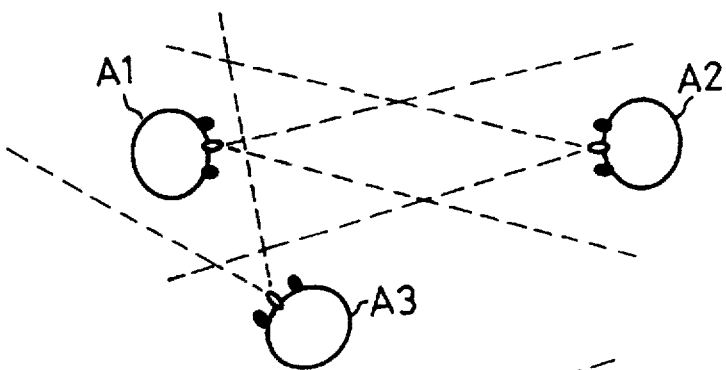
FIG. 9E is a diagram showing the relationship among three avatars when the conversation enable condition is their fields of vision.

(e) Also in such a situation as shown in FIG. 9E wherein the third avatar A3 approaches one (A1) of the two avatars A1 and A2 engaged in conversation with each other in a system utilizing the above-mentioned condition (b), the same processing as the above-described (d) may be performed.

Figure 9F:
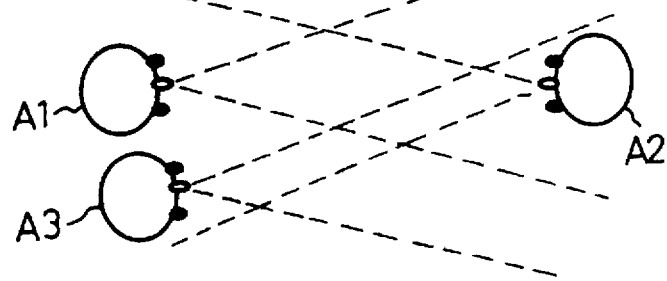
FIG. 9F is a diagram showing another example of the relationship among three avatars when the conversation enable condition is their fields of vision.

(f) Also in such a situation as shown in FIG. 9F wherein the third avatar A3 enters the field of vision of one (A2) of the avatars A1 and A2 engaged in conversation with each other in a system utilizing the above-mentioned condition (c), the same processing as the above-described (d) may be performed.

(g) Alternatively, it is possible to use the above-mentioned condition (c) as the conversation enable condition for the first two avatars A1 and A2 and a predetermined one of the conditions (a) and (b) as a condition for the third and subsequent avatars to join the conversation between the avatars A1 and A2.

Figure 10:
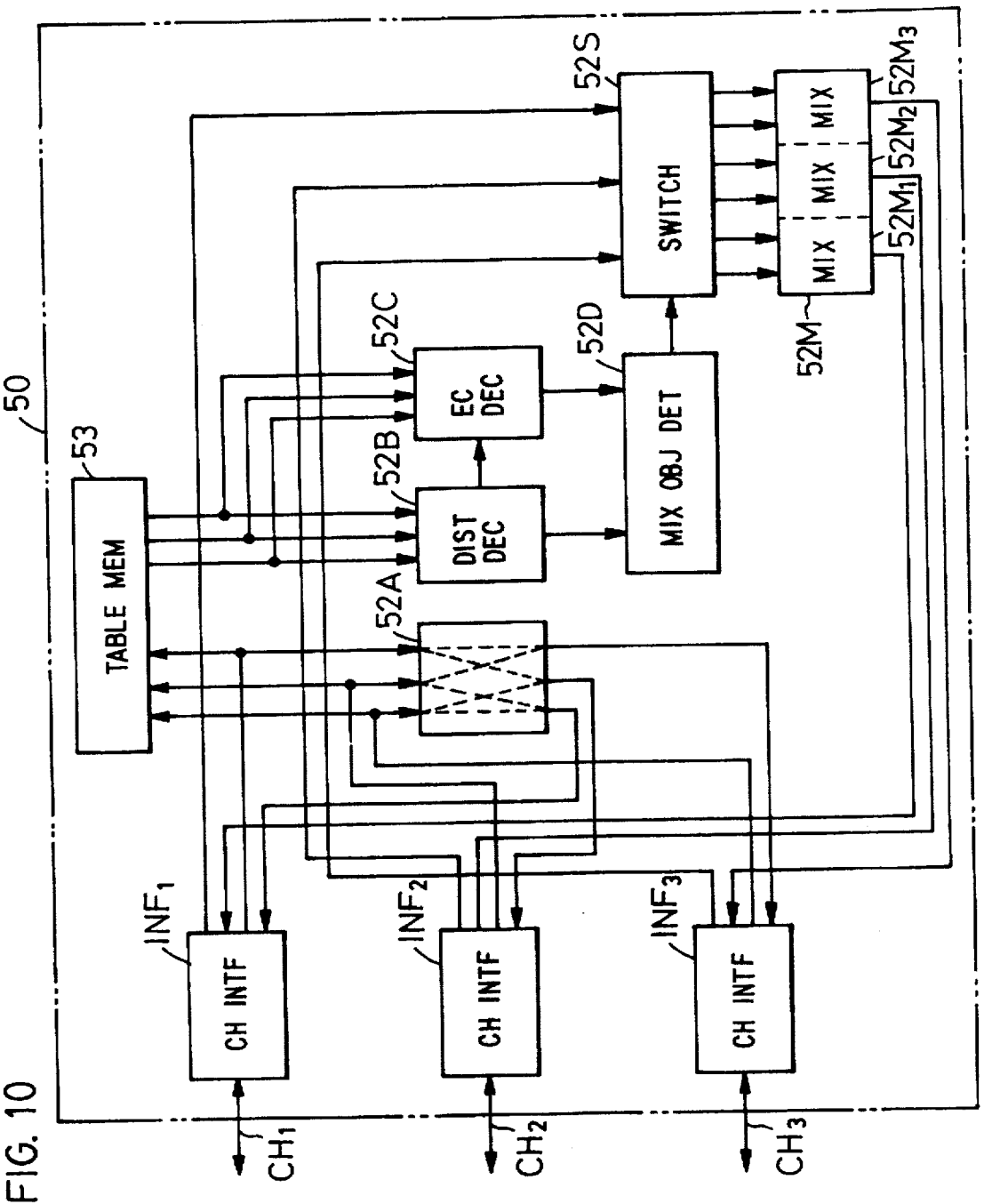
FIG. 10 is a block diagram illustrating an example of the construction of the server in the second embodiment.

FIG. 10 illustrates an example of the server of the virtual space sharing apparatus for use in the centralized connection type system which performs the processing (f). This example is shown to have three terminals. For the sake of brevity, no video-related parts are shown.

The server 50 swaps speech data and position information with the terminals via channels $CH_1$, $CH_2$ and $CH_3$. At first, the data received via the channels $CH_1$, $CH_2$ and $CH_3$ are received in channel interface parts $INF_1$, $INF_2$ and $INF_3$, respectively. The channel interface parts $INF_1$ to $INF_3$ analyze the received data and, in the case of speech data, transfer it to a speech switching part 52S. When the received data is position information containing position data and direction-of-eyes data, the channel interface parts $INF_1$ to $INF_3$ write the position data and the direction-of-eyes data in the table memory 53 and, at the same time, transfer them to a position information distributing part 52A. The position information distributing part 52A copies the position information received from the channel interface part $INF_1$ and transfers it to the channel interface parts $INF_2$ and $INF_3$ and copies the position information received from the channel interface part $INF_2$ and transfers it to the channel interface parts $INF_1$ and $INF_3$. Furthermore, the position information distributing part 52A copies the position information and direction-of-eyes information received from the channel interface part $INF_3$ and transfers them to the channel interface parts $INF_1$ and $INF_2$. A distance decision part 52B reads out the position information from the table memory 53 and calculates all distances $d_{ij}$ (i,j:1,2,3, i≠j) between avatars $A_i$ and $A_j$. The distance decision part 52B compares each distance $d_{ij}$ with a predetermined threshold value D and sets the distance $d_{ij}$ to a value 1 or 0, depending on whether $0<d_{ij}\leq D$ or $d_{ij}>0$, and transfers the value to a mixing object determining part 52D. An eye contact decision part 52C uses the position data and the direction-of-eyes data to calculate a value $w_{ij}$ which indicates whether either of the avatars are in the field of vision of the other. That is to say, the eye contact decision part 52C sets the value $w_{ij}$ to "1" or "0," depending on whether or not the viewing points (the positions of avatars) Ui and Uj are each in the field of vision of the other, and transfers the value $w_{ij}$ to a mixing object determining part 52D. The mixing object determining part 52D calculates the product, $p_{ij}=d_{ij}w_{ij}$, of the values $d_{ij}$ and $w_{ij}$ and instructs a switch 52S to connect the speech of the user Ui, for which the above-noted product is "1," to the channel CHj of the user Uj and the speech of the user Uj to the channel CHi of the user Ui.

Figure 11:
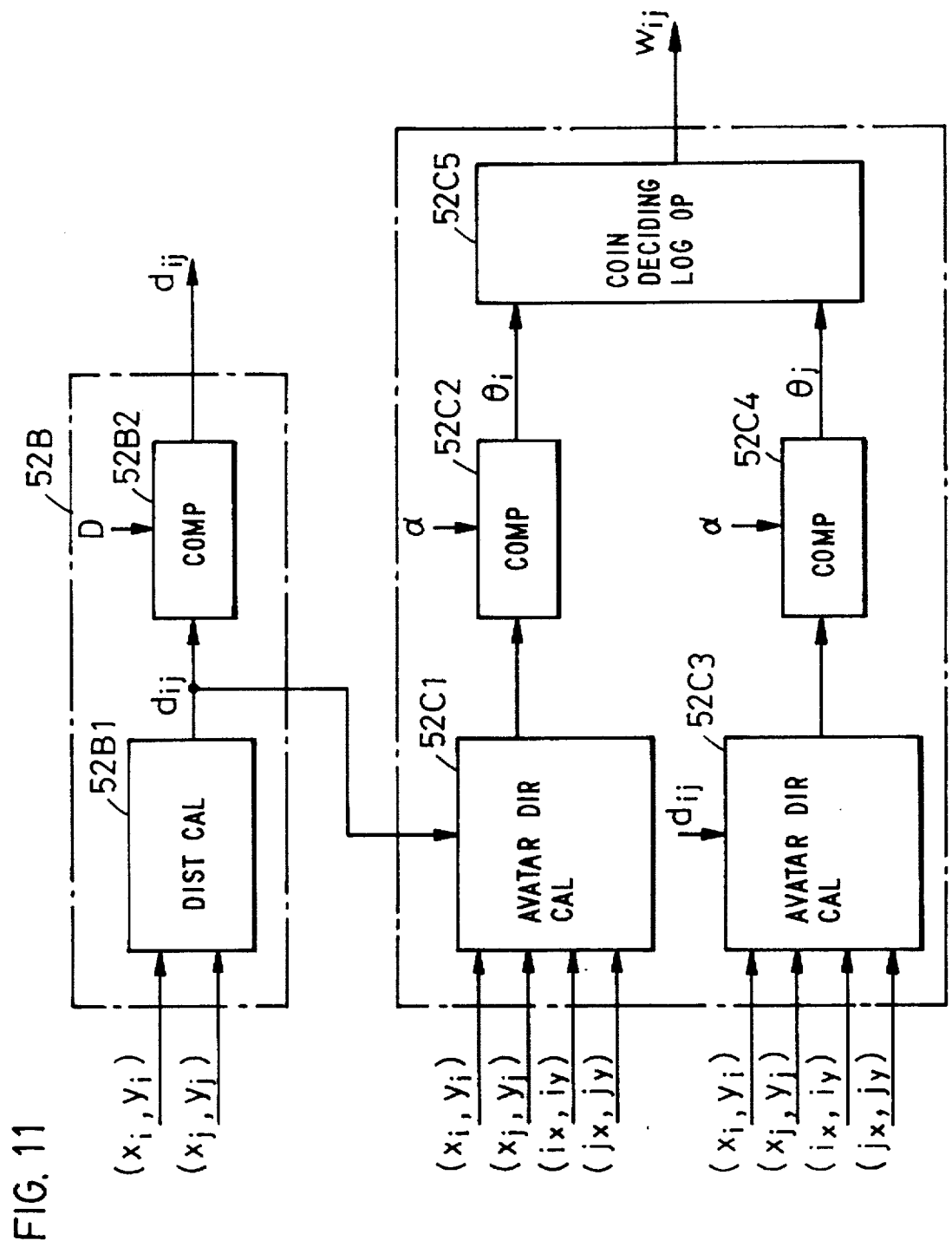
FIG. 11 is a block diagram illustrating the constructions of a distance deciding part and an eye contact deciding part in FIG. 10.

Now, a description will be given, with reference to FIGS. 11 and 12, of the principles of decision in the distance decision part 52B and the eye contact deciding part 52C. As shown in FIG. 11, the distance decision part 52B comprises a distance calculating part 52B1 for calculating the distance between two avatars and a comparison part 52B2 for making a check to see if the calculated distance is within the threshold value D. The eye contact deciding part 52C comprises direction-of-avatar calculating parts 52C1 and 52C3 each of which calculates the direction of one of two avatars from the other, comparison parts 52C2 and 52C3 which compare calculated directions $\theta_i$ and $\theta_j$ with a predetermined visual-field threshold value α to determine if either of the avatars are in the field of vision of the other, and a coincidence deciding logical operation part52C5 which uses the two results of comparison to determine if the two avatars establish eye-to-eye contact.

Figure 12:
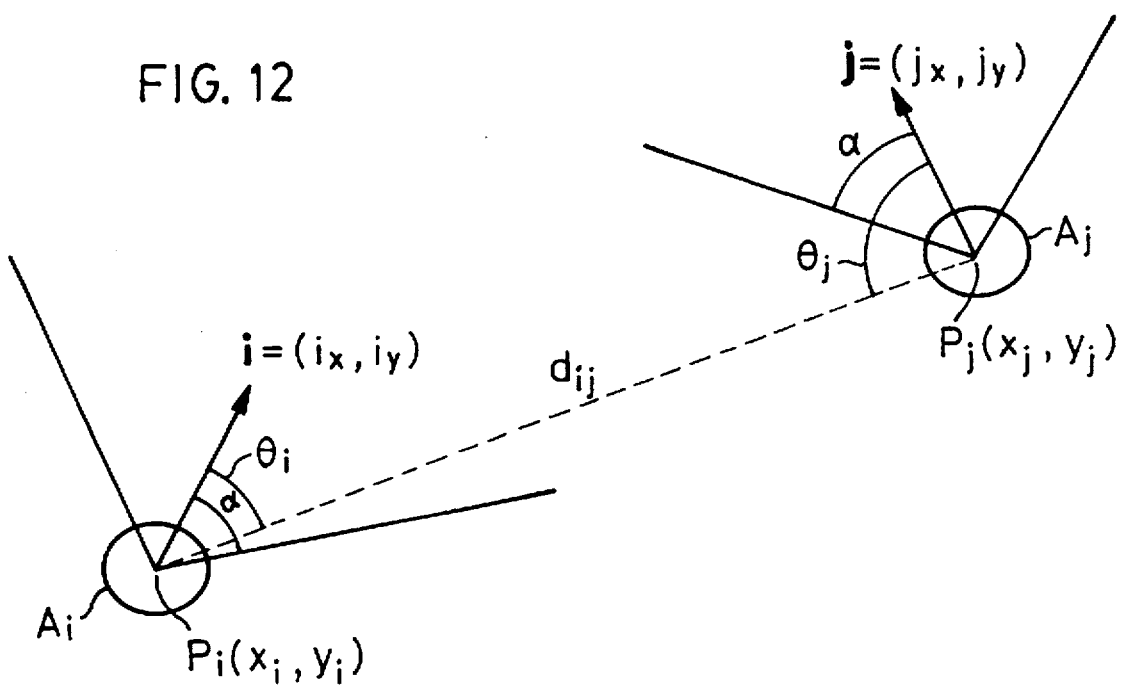
FIG. 12 is a diagram showing the positional relationship between avatars, for explaining the principles of detection of their eye contact.

As shown in FIG. 12, a coordinate axis is set in the virtual space VS; let the coordinates of the position $P_i$ of the avatar $A_i$ be $(x_i,y_i)$ and the coordinates of the position $p_j$ of the avatar $A_j$ be $(x_j,y_j)$. Furthermore, let the direction-of-eyes vector i of the avatar $A_i$ be $(i_x,i_y)$ and the direction-of-eyes vector j of the avatar $A_j$ be $(j_x,j_y)$. Incidentally, the direction-of-eyes vector is a unit vector.

The distance between the avatars $A_i$ and $A_j$ can be calculated by the following equation on the basis of the position coordinates $(x_i,y_i)$ and $(x_j,y_j)$ inputted into the distance calculating part 52B1.

$$d_{ij}=\{(x_j-x_i)^2+(y_j-y_i)^2\}^{1/2} \qquad (1)$$

The distance $d_{ij}$ is compared with the predetermined threshold value D, and as referred to previously, the distance $d_{ij}$ is set to a value "1" or "0," depending on whether $0<d_{ij}\leq D$ or $d_{ij}<D$. The distance value $d_{ij}$ thus set is transferred to the mixing object determining part 52D.

The coincidence deciding logical operation part 52C calculates a value w which indicates whether the fields of vision of users coincide with each other, on the basis of the position coordinates $(x_i,y_i)$ and $(x_j,y_j)$ and the direction-of-eyes vectors $(i_x,i_y)$ and $(j_x,j_y)$ inputted into the direction-of-avatar calculating parts 52C1 and 52C3.

$COS\theta_i$ can be determined by calculating the inner product of the vector i and the vector $P_{ij}$ from the coordinate $P_i$ to $P_j$.

$$i \cdot P_{ij} = |i| \cdot |P_{ij}| \cos \theta_i = i_x(x_j-x_i)+i_y(y_j-y_i)$$

where |i| is a unit vector=1 and $|P_{ij}|$ is the distance $d_{ij}$ between positions $P_i$ and $P_j$ which is expressed by Eq. (1). Therefore, the direction of existence $\theta_i$ of the avatar $A_j$ viewed from the avatar $A_i$ can be calculated by the following equation:

$$\begin{aligned}COS\theta_i &= \{i_x(x_j-x_i)+i_y(y_j-y_i)\}/\{(x_j-x_i)^2+ \\ &\quad (y_j-y_i)^2\}^{1/2} \\ &= \{i_x(x_j-x_i)+i_y(y_j-y_i)\}/d_{ij}\end{aligned} \qquad (2)$$

This calculation can also be conducted using the distance $d_{ij}$ calculated in the distance calculating part 52B1.

The direction $\theta_i$ thus calculated by the direction-of-avatar calculating part 52C1 is compared with the predetermined visual-field threshold value α in the comparison part 52C2, and it is set to a value "1" or "0," depending on whether $0<\theta_i\leq \alpha$ or $\alpha<\theta_i$. The thus set value $\theta_i$ is inputted into the coincidence deciding logical operation part 52C5.

Similarly, the direction of existence θjof the avatar $A_i$ viewed from the avatar $A_j$ can be determined by the following equation:

$$\cos\theta_j = \{j_x(x_i - x_j) + j_y(y_i - y_j)\}/\{(x_j - x_i)^2 + \quad (3)$$
$$(y_j - y_i)^2\}^{1/2}$$
$$= \{j_x(x_i - x_j) + j_y(y_i - y_j)\}/d_{ij}$$

The direction $\theta_j$ thus calculated in the calculating part 52C3 is compared with the predetermined visual-field threshold value α, and it is set to a value "1" or "0," depending on whether $0<\theta_j \leq \alpha$ or $\alpha \leq \theta_j$. The thus set value $\theta_i$ is inputted into the coincidence deciding logical operation part 52C5. FIG. 12 shows that the avatar $A_j$ is in the field of vision α of the avatar $A_i$, whereas the avatar $A_i$ is out of the field of vision α of the avatar $A_j$ and hence is not recognized. A preferable value of the visual angle α is 45 degrees, for instance.

The direction $\theta_i$ of the avatar $A_j$ viewed from the avatar $A_i$ and the direction $\theta_j$ of the avatar $A_i$ viewed from the avatar $A_j$, outputted from the comparison parts 52C2 and 52C4, respectively, are inputted into the coincidence deciding logical operation part 52C5, wherein a logical product $w_{ij}=\theta_i \cdot \theta_j$ is operated. Thus, the logical operation part 52C5 outputs a value $w_{ij}=1$ which expresses the coincidence of the fields of vision of the users only when $\theta_i \cdot \theta_j=1$ indicating either of the avatars is in the field of vision of the other. When either one of the value $\theta_i$ and $\theta_j$ is "0," the logical operation part 52C5 outputs a value $w_{ij}=0$. The output $w_{ij}$ from the logical operation part 52C5 is transferred to the mixing object determining part 52D. The mixing object determining part 52D uses the set value $d_{ij}$ from the distance decision part 52B and the set value $w_{ij}$ from the eye contact deciding part 52C to calculate $P_{ij}=d_{ij} \cdot w_{ij}$ as referred to previously and provides it to the switching part 52S.

The switching part 52S responds to the instruction of the mixing object determining part 52D select from voices received from the channel interface parts $INF_2$ and $INF_3$ those voices which satisfy a condition $p_{23}=1$, that is, those voices which are to be connected to the channel $CH_1$ accommodated in the channel interface part $INF_1$; the voices thus selected are mixed by a mixer $52M_1$ and the mixed output is provided to the channel interface part $INF_1$. Of voices received from the channel interface parts $INF_1$ and $INF_3$, those voices which satisfy a condition $p_{13}=1$, that is, those voices which are to be connected to the channel $CH_2$ accommodated in the channel interface part $INF_2$, are selected and mixed by a mixer $52M_2$, thereafter being transferred to the channel interface part $INF_2$. Similarly, of voices received from the channel interface parts $INF_1$ and $INF_2$, those voices which satisfy a condition $p_{12}32\ 1$, that is, those voices which are to be connected to the channel $CH_3$ accommodated in the channel interface part $INF_3$, are selected and mixed by a mixer $52M_3$, thereafter being transferred to the channel interface part $INF_3$.

The channel interface parts $INF_1$, $INF_2$ and $INF_3$ provide on the channels $CH_1$, $CH_2$ and $CH_3$ the position information containing the position data and the direction-of-eyes data, received from the position information distributing part 52, and the speech data received from the mixers $52M_1$, $52M_2$ and $52M_3$.

In the case of a system which implements the aforementioned conversation enable conditions (a) and (d), the eye contact deciding part 52C in FIG. 10 need not be provided and the mixing object determining part 52D controls the switch 52S on the basis of the distance $d_{ij}$ alone. The conversation enable conditions (b) and (e) can be implemented by ORing, $w_{ij}=\theta_i+\theta_j$, in the coincidence logical operation part 52C5 in FIG. 11.

Third Embodiment

Figure 13:
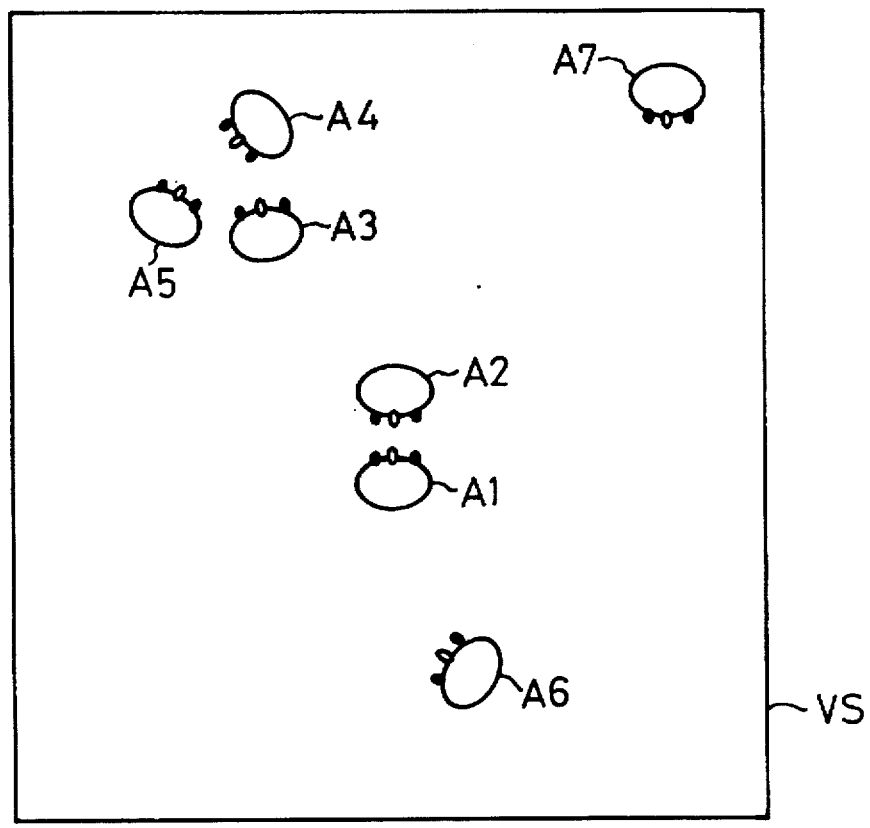
FIG. 13 is a diagram showing the positional relationship among avatars, for explaining an environment sound.

In the above embodiments, even if the number of avatars engaged in conversation is three or more, they can each hear voices of all the other avatars in that group but cannot hear voices of an avatar who stays out of the group. This will be described in respect of such a party as shown in FIG. 13 wherein there attend in the virtual space VC seven avatars A1 to A7 corresponding to users of seven terminals $10_1$ to $10_7$. As shown, the users of the avatars A1 and A2 are talking with each other and the users of the avatars A3 to A5 are also talking with one another, but the users of the avatars A6 and A7 are not engaged in the conversation of either group. If the users of the avatars A6 and A7 could hear voices of both groups as environment sounds, they would feel the existence of the other avatars in the virtual space VC like in the real world. Similarly, the users of the avatars A1 and A2 engaged in conversation could also experience enhanced realism of the virtual space VC if they could hear, as environment sounds, the voices of the avatars A3 to A5 and sounds made by the avatars A6 and A7.

Now, a description will be given of an embodiment of the virtual space sharing apparatus which allows all users in a shared virtual space to hear sounds made and voices uttered by them as environment sounds through dynamic switching of the setting of a speech path switch.

Figure 14:
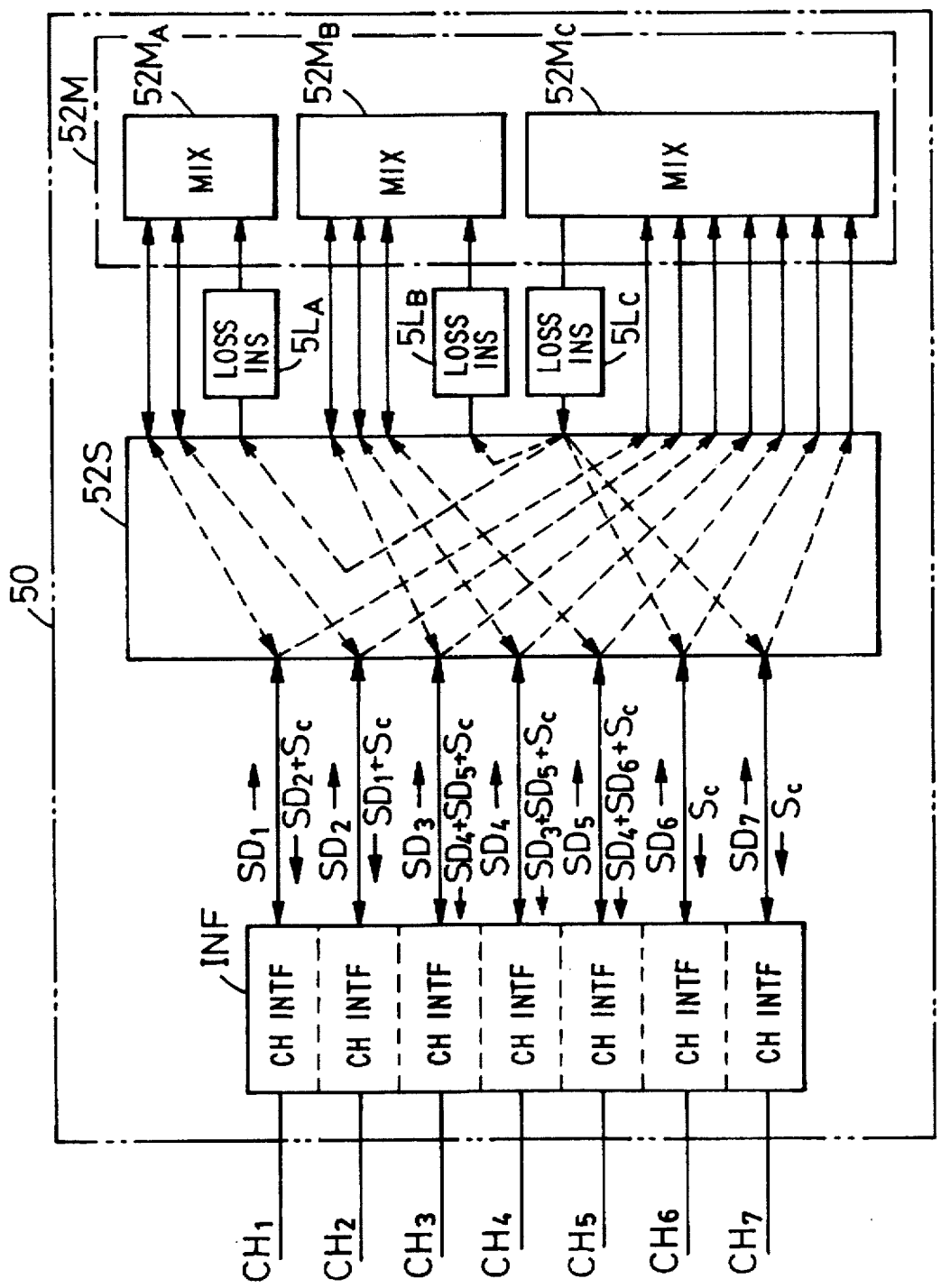
FIG. 14 is a diagram showing the state of channel connection in a server of a third embodiment of the present invention which generates an environment sound in the case of FIG. 13.

FIG. 14 shows how the speech path switch 52S and the mixer 52M in the server 50 of the apparatus of this embodiment are interconnected in the case of FIG. 13. Let it be assumed that the terminals $10_1$ to $10_7$ of the seven users are present in the same virtual space and that the group of two users corresponding to the terminals $10_1$ and $10_2$ and the group of three users corresponding to the terminals $10_3$, $10_4$ and $10_5$ are engaged in conversation independently of each other. In this embodiment, the mixer 52 is adaptively divided into mixing parts $52M_A$ and $52M_B$ corresponding to the two conversation groups, respectively, and a mixing part $52M_C$ for all the avatars in the virtual space VC.

The switch 52S has a construction which one-way connects sounds and voices received from all the terminals $10_1$ to $10_7$ to the mixing part $52M_C$. A sound $S_C$, produced by mixing the sounds and speech data $D_1$ to $D_7$ thus one-way transmitted from all the terminals $10_1$ to $10_7$, is attenuated by a loss inserting part $5L_C$ down to a level appropriate for an environment sound and transmitted to the terminals $10_6$ and $10_7$ of the users who are not engaged in conversation. In this way, the users of the terminals $10_6$ and $10_7$ can hear, as environment sounds, the sounds made and voices uttered by all the users present in the shared virtual space.

On the other hand, the switch 52S two-way connects the speech data $SD_1$ and $SD_2$ sent from the terminals $10_1$ and $10_2$ to the mixing part $52M_A$ and, at the same time, it one-way connects the mixed sound $S_C$, inputted from the mixing part $52M_C$ via the loss inserting part $5L_C$, to a loss inserting part $5L_A$ to attenuate to such a sound pressure level as not to hinder conversation, after which the mixed sound $S_C$ is provided to the mixing part $52M_A$. The mixing part $52M_A$ mixes the speech data $SD_2$ from the terminal $10_2$ and the environment sound $S_C$ and sends the mixed sound to the terminal $10_1$ via the switch 52S; furthermore, the mixing part $52M_A$ mixes the speech data $SD_1$ from the terminal $10_1$ and the environment sound $S_C$ and sends the mixed sound to the terminal $10_2$ via the switch 52S. Thus, the users of the terminals $10_1$ and $10_2$ are capable of hearing the environment sound $S_C$ of the reduced sound pressure level while at the same time carrying on a two-way conversation as in the case of talking to each other over the telephone. As regards the group of the terminals $10_3$ to $10_5$, too, the output from the mixing part $52M_C$ is similarly connected to the mixing part $52m_b$ via the loss inserting parts $5L_C$ and $5L_B$, and the mixing part $52M_B$ generates speech data to be sent to each terminal by mixing speech data from all the other terminals and the environment sound $S_C$ and sends it to the terminals via the switch 25S, enabling the users of the terminals to hear the environment sound $S_C$ of the lowered sound pressure level while carrying on two-way conversation.

Figure 15:
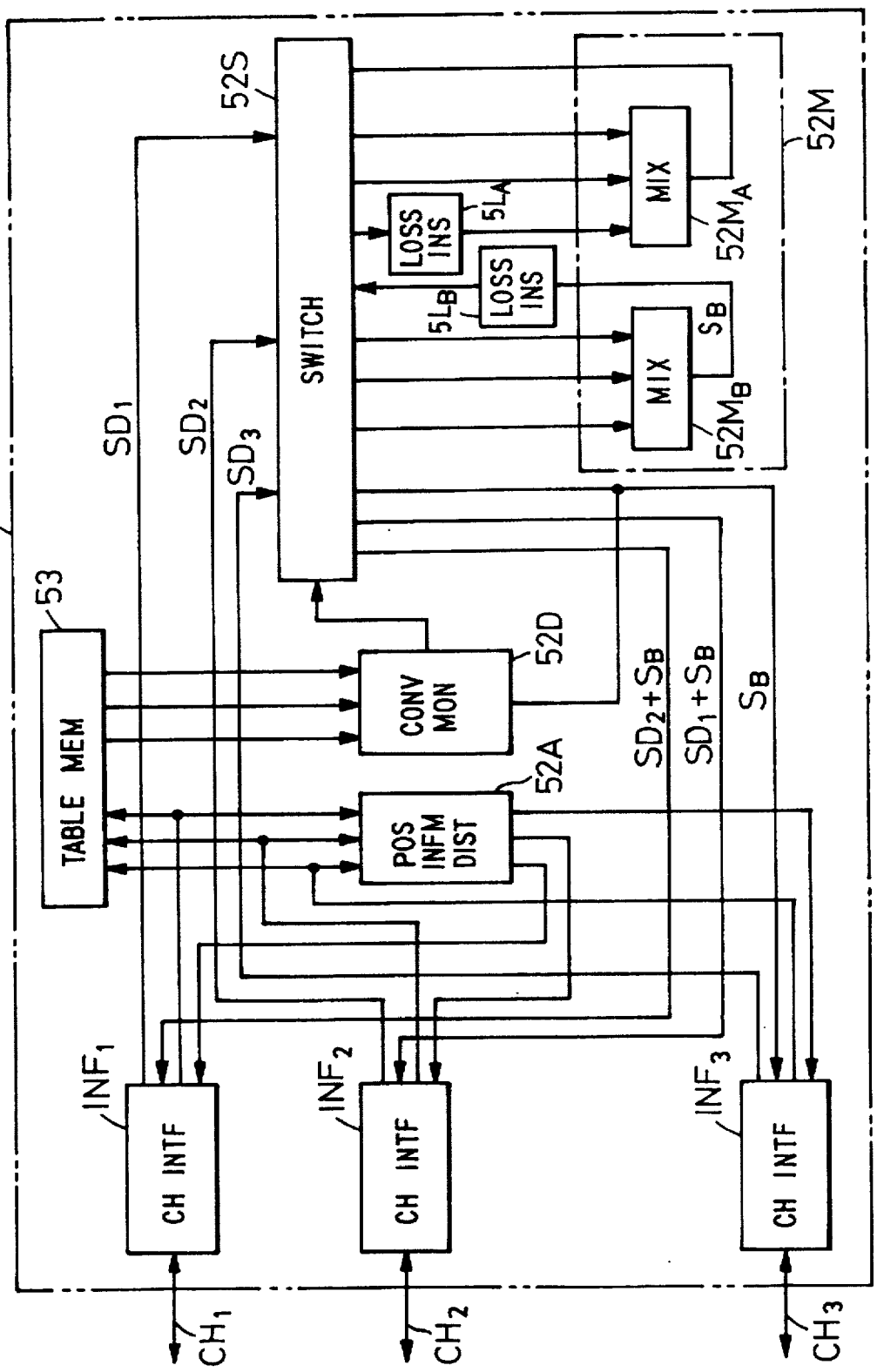
FIG. 15 is a block diagram illustrating the construction of the server in the third embodiment.

Turning now to FIG. 15, the server 50, which is provided with the switch 52S and the mixer 52M shown in FIG. 14, will be further described. Let it be assumed, for the sake of brevity, that the number of terminals is three and that the users of the terminals $10_1$ and $10_2$ are talking with each other, leaving the user of the terminal $10_3$ alone. In FIG. 14 the interface INF and the switch 52S are two-way connected, but in FIG. 15 the channel interface parts $INF_1$ to $INF_3$ and the switch 52S are shown to be one-way connected with a view to showing the kinds of speech data that are transmitted and received between them. In FIG. 15, the virtual space and respective terminals transmit audio data and position information data via an advanced information system INS network and the channels $CH_1$ to $CH_3$ in the server 50. At first, pieces of data received via the channels $CH_1$ to $CH_3$ are received in the channel interface parts $INF_1$ to $INF_3$, respectively. The channel interface part $INF_1$ analyzes the received data and, if it is speech data $SD_1$, transfers it to the switch 52S. Likewise, the channel interface parts $INF_2$ and $INF_3$ analyze the received data and, if they are speech data $SD_2$ and $SD_3$, transfer them to the switch 52S.

When the received data is position data and direction-of-eyes data, the channel interface parts $INF_1$ to $INF_3$ transfer these pieces of data to the position information distributing part 52A and write them into the table memory 53. The position information distributing part 52A copies the position data and direction data received from the channel interface part $INF_1$ and transfers them to the channel interface parts $INF_2$ and $INF_3$. Similarly, the position information distributing part 52A copies the position data and direction data received from the channel interface part $INF_2$ and transfers them to the channel interface parts $INF_1$ and $INF_3$ and copies the position data and direction data received from the channel interface part $INF_3$ and transfers them to the channel interface parts $INF_1$ and $INF_2$.

A conversation monitoring part 52D discriminates a group of avatars that satisfies the aforementioned predetermined conversation enable conditions on the basis of the position data and direction-of-eyes data read out of the table memory 53 and defines or specifies in the mixer 52M the mixing part $52M_A$ which mixes speech data from the terminals corresponding to the avatars of the group and the mixing part $52M_B$ which generates an environment sound from speech data from the terminals corresponding to all avatars in the virtual space. The conversation monitoring part 52D controls the switch 52S to supply the mixing part $52M_A$ with the speech data $SD_1$ and $SD_2$ received from the terminals $10_1$ and $10_2$ corresponding to the avatars of the discriminated group and the mixing part $52M_B$ with the speech data $SD_1$, $SD_2$ and $SD_3$ from all the avatars. Thus, the switch 52S transfers the speech data $SD_1$ to $SD_3$ received from the channel interface parts $INF_1$ to $INF_3$ to the mixing part $52M_B$. The mixing part $52M_B$ mixes the speech data $SD_1$ to $SD_3$ and transfers the mixed sound $S_B$ as an environment sound to the switch 52S via a loss inserting part $5L_B$. The switch 52S sends the environment sound $S_B$ to the channel interface part $INF_3$ corresponding to the terminal $10_3$ of the user not engaged in conversation and, at the same time, provides the sound $S_B$ via a loss inserting part $5L_A$ to the mixing part $52M_A$. The mixing part $52M_A$ mixes the sound $S_B$ with the speech data $SD_1$ and $SD_2$ from the channel interface parts $INF_1$ and $INF_3$, respectively, and sends the mixed sounds $SD_1+SD_B$ and $SD_2+SD_B$ to the channel interface parts $INF_2$ and $INF_1$, from which they are sent to the terminals $10_2$ and $10_1$, respectively.

As the conversation enable condition for the conversation monitoring part 52D to identify the avatars of the conversation group, it is possible to use the aforementioned conditions such as the distance between the avatars of the users, their mutual existence in the field of vision of the other, or a combination thereof. When the avatars of the conversation group end the conversation and enter a state in which the conversation enable condition is 5 not satisfied, the conversation monitoring part 52D cuts off the paths from the channel interface parts $INF_1$ and $INF_2$ to the mixing part $52M_A$ and controls the switch 52S to send the environment sound $S_B$ from the mixing part $52M_B$ to the channel interface parts $INF_1$ to $INF_3$ via the loss inserting part $5L_B$.

Figure 16:
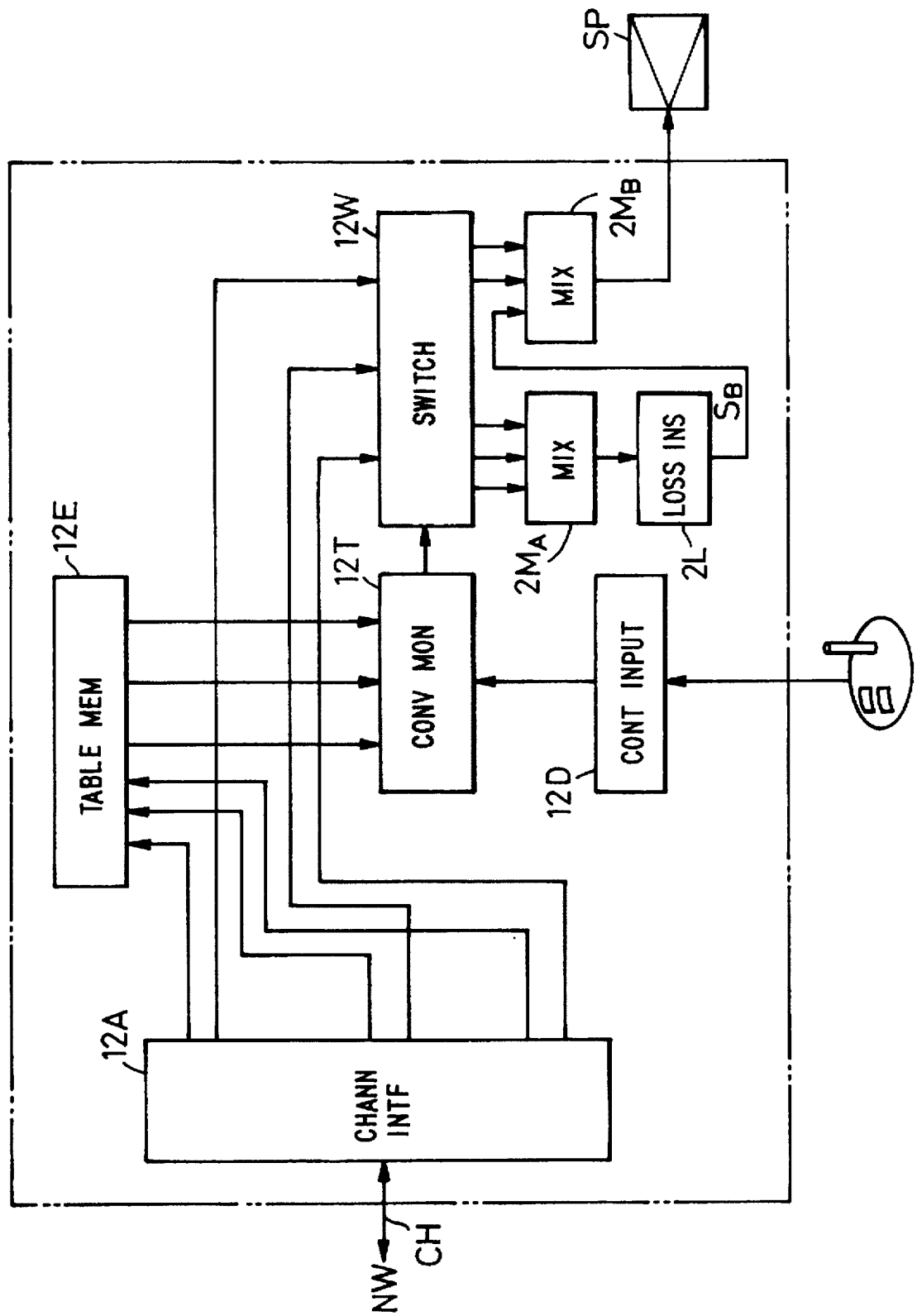
FIG. 16 is a block diagram illustrating the construction of a terminal for use in the case where the third embodiment is realized as a distributed connection type system.

The FIG. 15 embodiment has been described as being applied to the centralized connection type system; in the case of the distributed connection type system, as depicted in FIG. 16 (wherein no video-related parts are shown), position information of avatars received from respective terminals is written into a table memory 12E. A conversation monitoring part 12T controls a switch 12W to supply a mixing part $2M_A$ with voice data received from the terminals corresponding to other avatars detected from their position information read out of the table memory 12E. By this, mixed voice data of all the avatars is obtained from the mixing part $2M_A$, and the mixed voice data is provided to a loss inserting part 2L, wherein a predetermined loss is introduced thereinto to generate the environment sound $S_B$, which is provided to a mixing part $2M_B$. On the other hand, the conversation monitoring part 12T detects other avatars which satisfy the condition for conversation direction or indirectly with the avatar of the terminal concerned on the basis of the position information of other avatars and the position information of the avatar concerned set by the control device 14 and controls the switch 12W to supply the mixing part $2M_B$ with voice data received from the terminals corresponding to the above-mentioned other avatars satisfying the conversation enable conditions. As the result of this, the mixing part $2M_B$ mixes the voices of the other avatars engaged in conversation with the avatar of the terminal user concerned, together with the environment sound $S_B$, and the mixed output is provided to the speaker SP.

As described above, the virtual space sharing apparatus of this embodiment lends more realism to the virtual space by supplying the environment sound to all avatars regardless of whether they are engaged in conversation or not.

Fourth Embodiment

With the apparatus of the above embodiment, it is possible to enhance the realism of the virtual space by feeding the environment sound to all avatars in the virtual space, but since the voices of other avatars contained in the environment sound have the same level, each avatar cannot feel a sense of distance with respect to the other avatars. Besides, mixing of voices from all terminals poses a noise problem when the number of terminals is large. The same problems also arise in the same conversation group, since the voices of other avatars are of the same level. Now, a description will be given of an embodiment of the virtual space sharing apparatus adapted to dynamically change the quality of voices to be mixed on the basis of the position information of individual avatars.

In this embodiment, the voices of other avatars to be mixed for each avatar are graded or classified into some levels of quality on the basis of such information as listed below.

(a) The position information of the avatar of each user is used to grade the voice of another avatar according to the length of a straight line joining the position coordinates of both users.

(b) The position information and direction-of-eyes information of the avatar of each user are used to grade the voice of another avatar, depending on whether another user is in the field of vision of the user concerned.

(c) The position information and direction-of-eyes information of the avatar of each user are used to grade the voice of another user according to the angle between a straight line joining the position coordinates of the two users and the direction of eyes of the user concerned.

(d) The position information and direction-of-eyes information of the avatar of each user are used to turn the directions of eyes of the user and another user to a straight line joining their position coordinates to grade the voice of another user according to the sum of both angles of rotation.

(e) Some of the conditions (a) to (d) are combined to grade the voices of the users.

FIGS. 17 to 20 are bird's-eye views of virtual spaces, showing examples of the grading of voices into some levels of quality in accordance with the relationship between the avatar A1 and the other avatars. For the sake of brevity, this embodiment will be described in connection with the case of classifying the voices of the other avatars in terms of sound pressure level.

Figure 17:
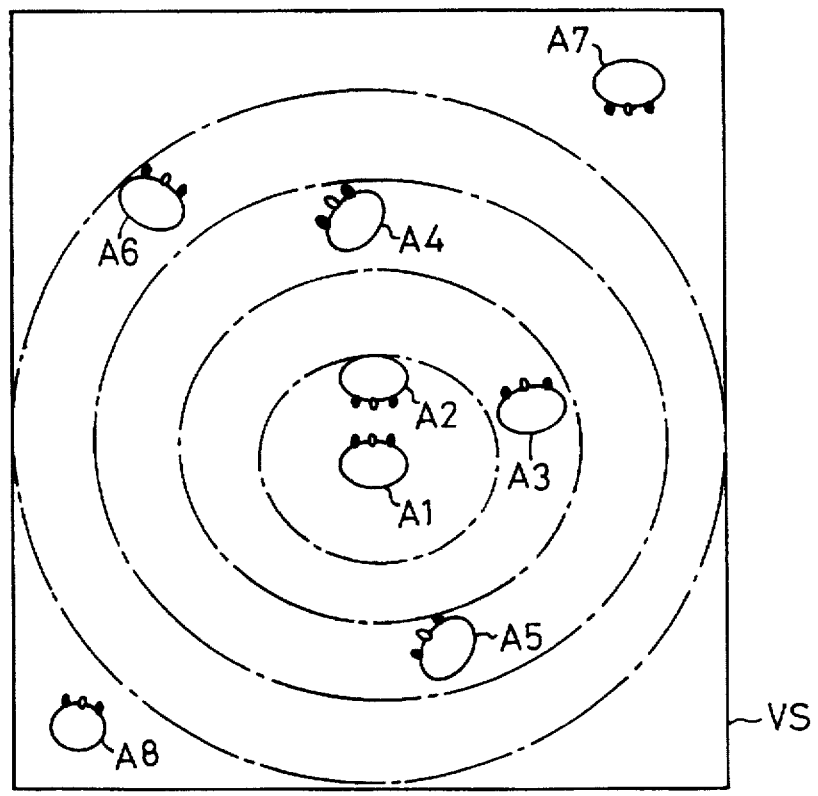
FIG. 17 is a diagram showing an example of the assignment of priorities to avatars on the basis of distance.

In the example of FIG. 17, concentric circles are drawn about the avatar A1 and the voices of avatars in circles of smaller radii are graded up to higher levels of quality. This example uses five levels of quality. That is, the voice of the avatar A2 closest to the avatar A1 is graded up to the highest level(loss rate: 0 dB) and the voice of the avatar A3 is graded to the second highest level (loss rate: −10 dB). The voices of the avatars A4 and A5 (loss rate: −13 dB), the voice of the avatar A6 (loss rate: −16 dB) and the voices of the avatars A7 and A8 (loss rate: −19 dB) are thus graded down in this order. This processing is carried out for each of all the remaining avatars in the virtual space. While this example employs the simplest grading method which uses concentric circles, various other methods can be used. For example, the voice of an avatar in front of the noted one A1 is graded to a higher level than the voice of an avatar behind through utilization of human hearing or auditory characteristics.

Figure 18:
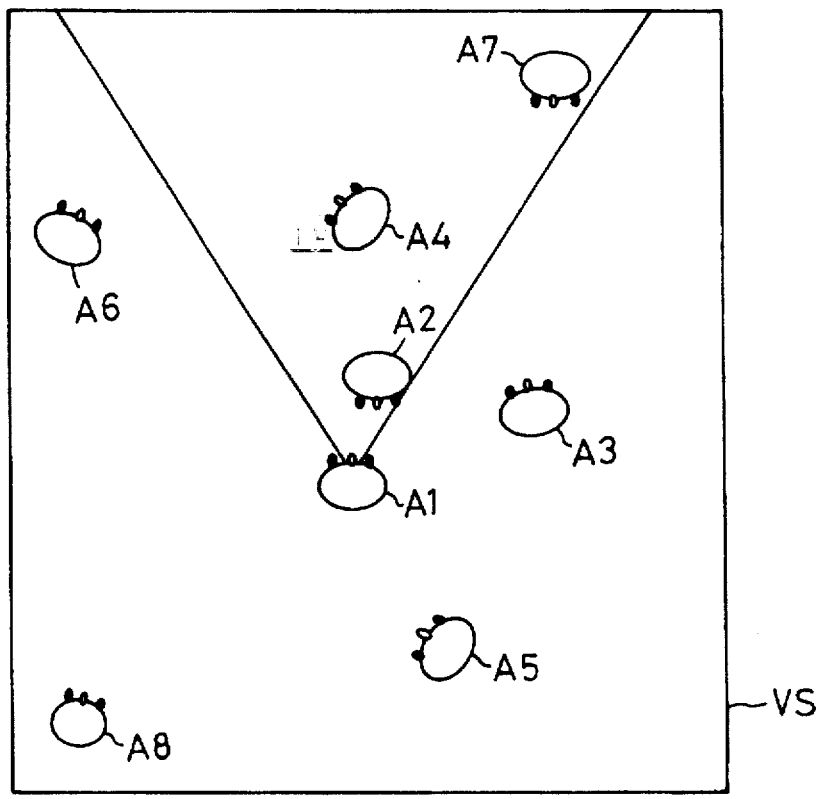
FIG. 18 is a diagram showing an example of the assignment of priorities to avatars on the basis of field of vision.

In the example of FIG. 18, the field of vision of the avatar A1 is calculated from the direction of eyes thereof and the voices of avatars in that field of vision are preferentially graded up to higher levels. This example employs two levels of quality. That is, the sound pressure levels of the voices of the avatars A2, A4 and A7 are increased (loss rate: 0 dB), whereas the sound pressure levels of the voices of the avatars A3, A5, A6 and A8 not in the field of vision are decreased (loss rate: −19 dB). This processing is carried out for each of the other remaining avatars in the virtual space. In this case, the visual angle of each avatar is predetermined in the system.

Figure 19:
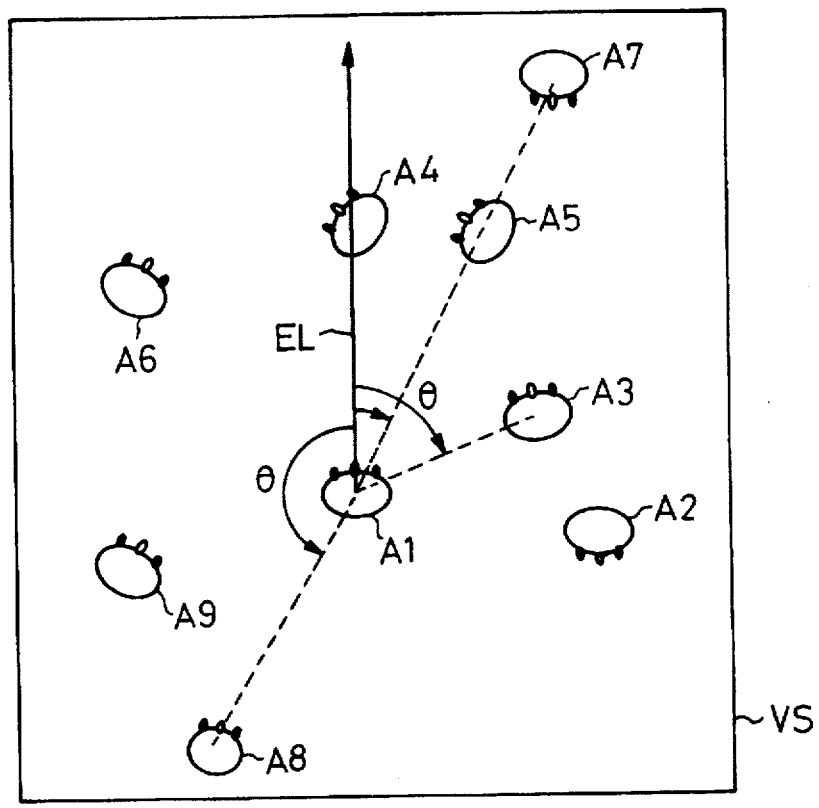
FIG. 19 is a diagram showing an example of the assignment of priorities to avatars on the basis of the direction of eyes.

The example of FIG. 19 employs the angle θ between the direction of eyes or line of sight EL of the avatar A1 and a straight line joining the avatar A1 and each of the other avatars. The voices from the avatars of smaller angle are preferentially graded up to higher levels of quality. This example uses five levels of quality. That is, the sound pressure level of the voice of the avatar A4 (θ=0) on the line of sight EL of the avatar A1 is increased (loss rate: 0 dB); the voices of the avatars A7 and A5 with $-45°\leq\theta\leq 90°$ are set to a loss rate of −10 dB; the voices of the avatars A3 and A6 with $-90°\leq\theta<-45°$ or $45°<\theta\leq 90°$ are set to a loss rate of −13 dB; the voices of the avatars A9 and A2 with $-135°\leq\theta<-90°$ or $90°<\theta\leq 135°$ are set to a loss rate of −16 dB; and the voices of the avatars (e.g. A8) with $-180°\leq\theta<-135°$ or $135°<\theta\leq 180°$ are set to a loss rate of −19 dB. This processing is carried out for each of all the other remaining avatars.

Figure 20:
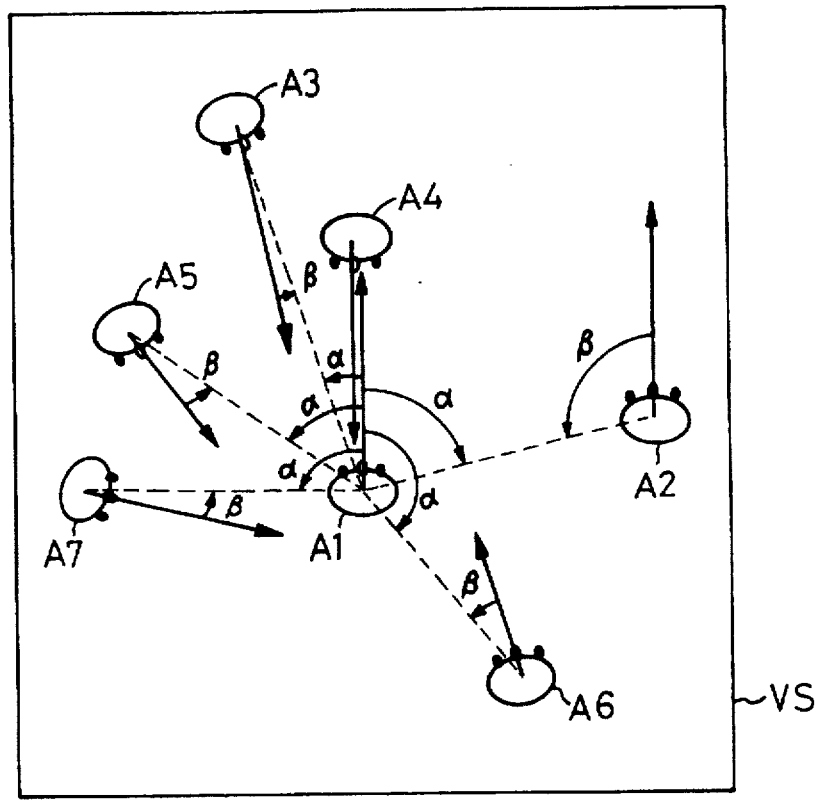
FIG. 20 is a diagram showing an example of the assignment of priorities to avatars on the basis of eye contact.

In the example of FIG. 20, the avatar A1 and each of the other avatars are joined by a straight line as indicated by the broken line and the line of sight of the avatar A1 is turned until it comes into alignment with the straight line and the turning angle α is calculated. The direction of rotation in this case is the direction in which the angle α decreases. Similarly, the line of sight of the other avatar is turned until it comes into alignment with the straight line and the turning angle β is calculated. The direction of turn in this case is the direction in which the angle β decreases. Then, the sum of the two turning angles, α+β=θ, is calculated. The voices of the avatars of the smaller angles are graded up to higher levels of quality. This example uses five levels of quality. That is, the sound pressure level for the avatar A4 to which the line of sight of the avatar A1 conforms (θ=0°) is increased, whereas the loss rates for the avatar A3 with $0°<\theta\leq 45°$, the avatar A5 with $45°<\theta\leq 90°$, the avatar A6 with $90°<\theta<135°$ and the avatar A2 with $135°<\theta\leq 180°$ are set to −10 dB, −13 dB, −16 dB and −19 dB, respectively. This processing is carried out for each of all the other avatars in the virtual space.

The methods of determining the loss rate as described above in respect of FIGS. 17 to 20 may be used singly or in combination. With the combined use of the methods of FIGS. 17, 18 and 20, for instance, it is possible to make the voice of the avatar in the field of vision of the avatar A1 larger as the distance between them decreases and as the degree of coincidence of their directions of eyes increases.

Figure 21:
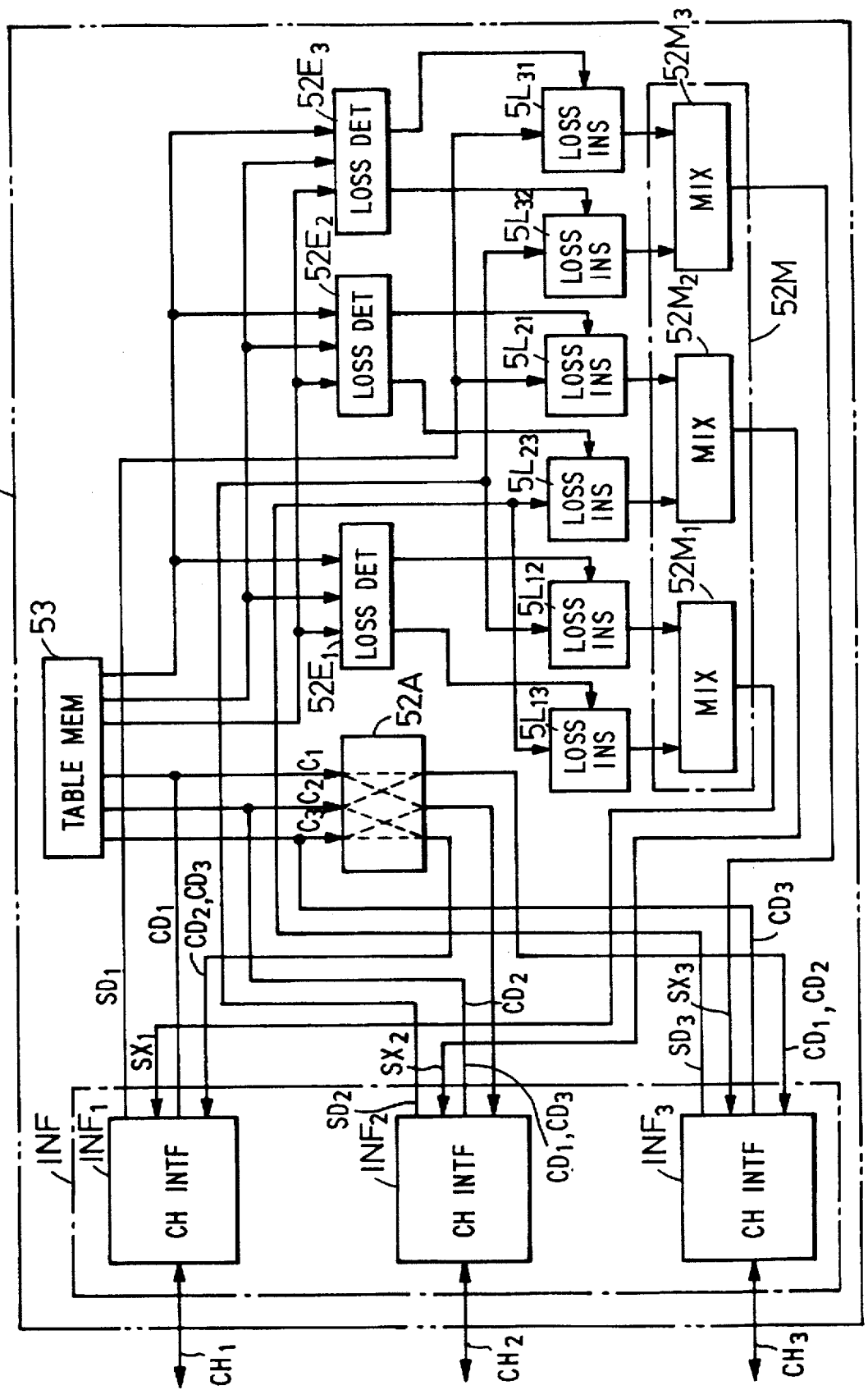
FIG. 21 is a block diagram illustrating a server in a fourth embodiment of the present invention which controls the speech quality on the basis of the priorities assigned to avatars.

FIG. 21 illustrates an example of the configuration of the server 50 which effects the above-described voice quality control in the centralized connection type virtual space sharing apparatus. For the sake of simplicity, the server 50 is shown to accommodate three terminals. The server 50 is connected to terminals $10_1$, $10_2$ and $10_3$ (see FIGS. 2A and 2B) via the channels $CH_1$, $CH_2$ and $CH_3$ and receives data therefrom in the channel interface parts $INF_1$, $INF_2$ and $INF_3$, respectively.

When the received data is position data and direction-of-eye data, the channel interface parts $INF_1$ to $INF_3$ transfer them to the position information distributing part 52A and, at the same time, write them into the table memory 53.

As in the case of the FIG. 10 embodiment, the position information distributing part 52A copies the position data and direction-of-eyes data received from the channel interface part $INF_1$ and transfers them to the channel interface parts $INF_2$ and $INF_3$, copies and transfers the position data and direction-of-eyes data received from the channel interface part $INF_2$ to parts $INF_1$ and $INF_3$, and copies and transfers the position data and direction-of-eyes data received from the channel interface part $INF_3$ to parts $INF_1$ and $INF_2$.

A loss determining part $52E_1$ uses the position data and direction-of-eyes data read out of the table memory 53 to calculate, by the methods described previously with reference to FIGS. 17 to 20, the loss rates of voices of other users to be provided to the user of the terminal accommodated in the channel interface part $INF_1$. Based on the loss rates thus determined, the loss determining part $52E_1$ sends loss-inserting instructions to loss inserting parts $5L_{12}$ and $5L_{13}$ corresponding to the users of the terminals accommodated in the channel interface parts $INF_2$ and $INF_3$. Similarly, a loss determining part $52E_2$ also sends loss-inserting instructions to loss inserting parts $5L_{21}$ and $5L_{23}$ corresponding to the users of the terminals accommodated in the channel interface parts $INF_1$ and $INF_3$. Also a loss insertion determining part $52E_3$ similarly sends loss-inserting instructions to loss inserting parts $5L_{31}$ and $5L_{32}$ corresponding to the users of the terminals accommodated in the channel interface parts $INF_1$ and $INF_2$.

The channel interface part $INF_1$ analyses received data and, if it is speech data, transfers the speech data $SD_1$ to the loss inserting parts $5L_{21}$ and $5L_{31}$. Likewise, the channel interface part $INF_2$ analyses received data and, if it is speech data, transfers the speech data $SD_2$ to the loss inserting parts $5L_{12}$ and $5L_{32}$. Also the channel interface part $INF_3$ similarly analyses received data and, if it is speech data, then transfers the speech data $SD_3$ to the loss inserting parts $5L_{13}$ and $5L_{23}$. By this, the above-mentioned loss is inserted in the speech data fed to each loss inserting part.

A speech mixing part $52M_1$ mixes the speech data with the losses inserted therein by the loss inserting parts $5L_{12}$ and $5L_{13}$ and transfers the mixed output to the channel interface part $INF_1$, from which it is sent to the terminal $10_1$ via the channel $CH_1$. A speech mixing part $52M_2$ mixes the speech data with the losses inserted therein by the loss inserting parts $5L_{21}$ and $5L_{23}$ and transfers the mixed output to the channel interface part $INF_2$, from which it is sent to the terminal $10_2$ via the channel $CH_2$. Similarly, a speech mixing part $52M_3$ also mixes speech data with losses inserted therein by the loss inserting parts $5L_{31}$ and $5L_{32}$ and transfers the mixed output to the channel interface $INF_3$, from which it is sent to the terminal $10_3$ via the channel $CH_3$.

Figure 22:
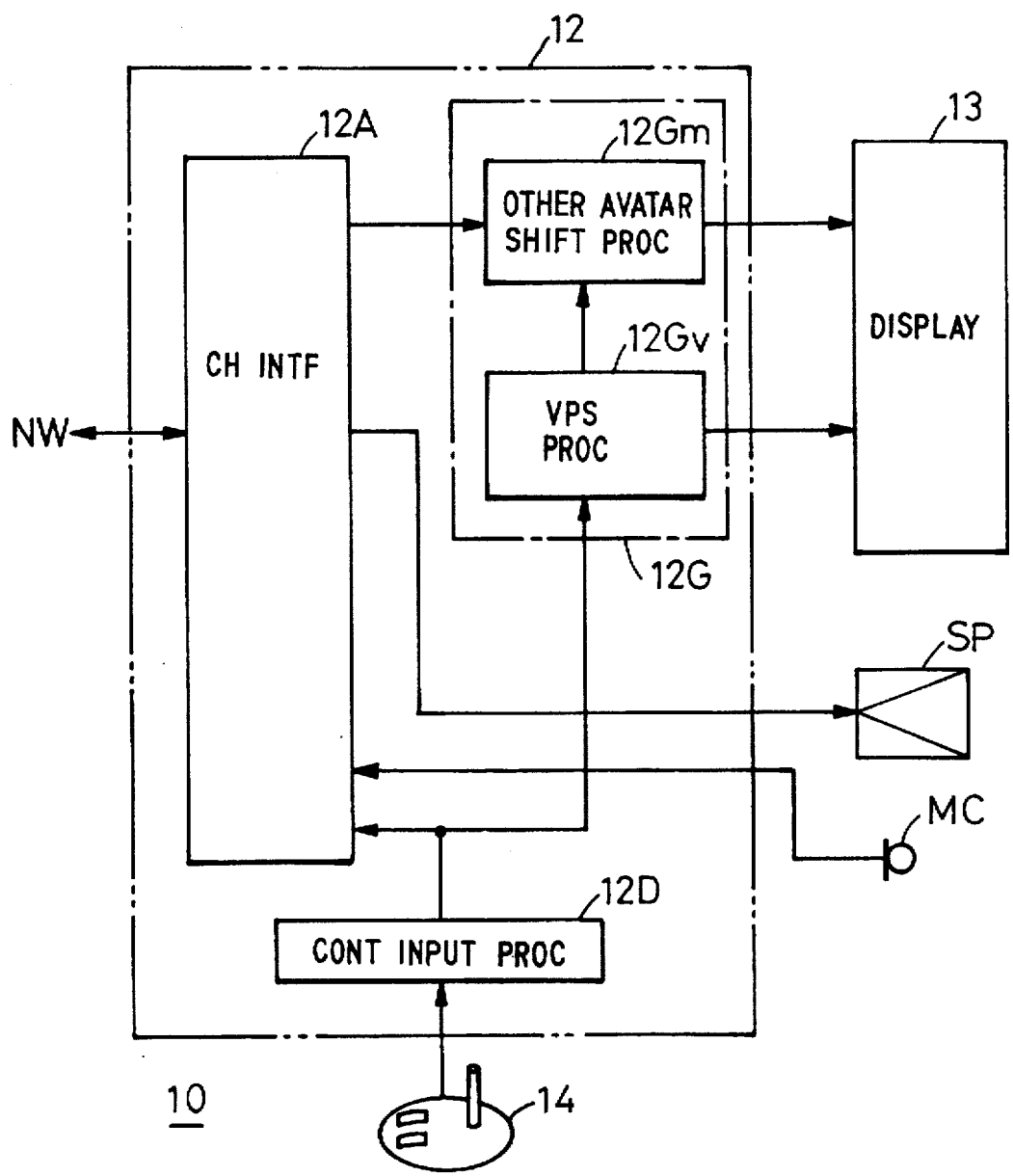
FIG. 22 is a block diagram illustrating the terminal configuration in the fourth embodiment.

FIG. 22 illustrates in block form an example of one terminal 10 which is connected to the server 50 shown in FIG. 21. The parts corresponding to those in FIGS. 3 and 7 are identified by the same reference numerals and characters.

The channel interface part 12A of the terminal control part 12 is connected via the communication network NW to the server 50 depicted in FIG. 21. The control input processing part 12D sends position data and direction-of-eyes data of the user's avatar inputted from the control device 14 to the server 50 via the channel interface part 12A and the communication network NW and, at the same time, sends the same data to a viewing point shift processing part 12Gv of the video image generating part 12G.

The viewing point shift processing part 12Gv of the video image generating part 12G uses the position data and direction-of-eyes data of the avatar received from the control input processing part 12D to shift the viewing point in the virtual space and display on a display 13 video images that come into the field of vision. Another avatar shift processing part 12Gm forms avatar images of other users at specified positions and in specified directions in the visual field image in correspondence with position data and direction-of-eyes data of the other users' avatars received from the server 50 via the channel interface part 12A and displays them on the display 13.

The voice received in the channel interface part 12A is outputted to the speaker SP. The voice of the user of this terminal, inputted from the microphone MC, is sent via the channel interface part 12A to the server 50.

While FIGS. 21 and 22 show examples of the constructions of the server and the terminal for use in the centralized connection type virtual space display apparatus, the same principles described above can also be applied to the distributed connection type virtual space sharing apparatus.

Figure 23:
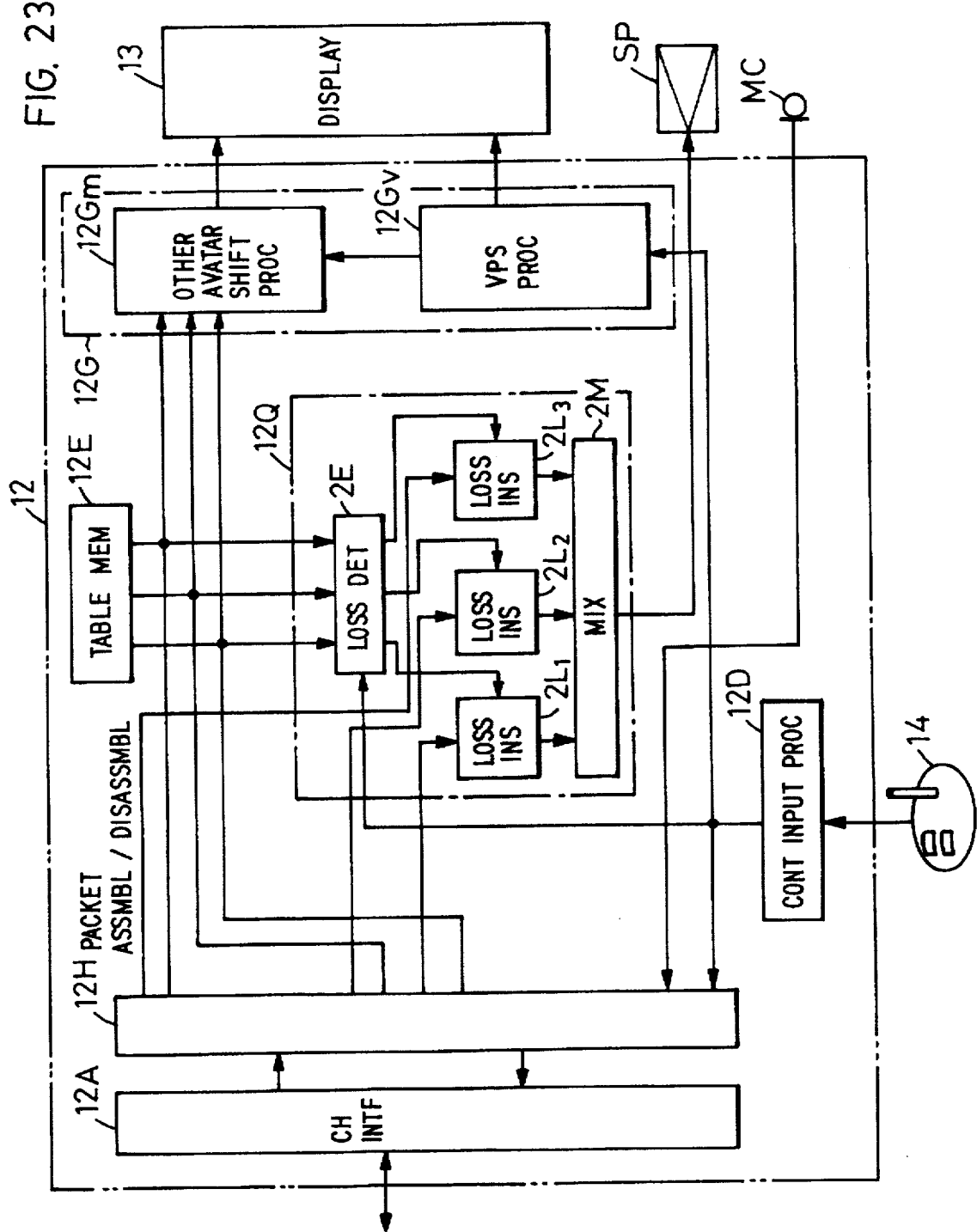
FIG. 23 is a block diagram illustrating the terminal configuration in an embodiment of the distributed connection type system which controls speech quality.

FIG. 23 illustrates an example of the configuration of one terminal 10 for use in the distributed connection type virtual space sharing apparatus which effects the aforementioned speech quality control. In this example, the number of terminals of other users is three. In the centralized connection type system, the terminal 10 of FIG. 22 sends and receives position data, direction-of-eyes data and speech data to and from the server 50 of FIG. 21 and voices are mixed in the server 50 in correspondence with respective users. In contrast thereto, in the distributed connection type system of FIG. 23, a speech quality of control part 12Q is provided in the terminal control part 12 of each user terminal and, based on the position data and/or direction-of-eyes data received from the other terminals and stored in the table memory 12E, the sound pressure level for each of the other users' avatars is determined in a loss determining part 2E by a desired one of the methods described previously with respect to FIGS. 17 to 20; the losses thus determined are set in loss inserting parts $2L_1$, $2L_2$ and $2L_3$, respectively. The pieces of speech data received from the other terminals are attenuated by the losses set in the loss inserting parts $2L_1$ to $2L_3$ and then mixed by a mixer 2M, thereafter being outputted to the speaker SP. The basic principles and operations are the same as those described previously.

As described above, according to this embodiment, at the time of mixing users' voices received from respective terminal units, their speech quality is changed according to the distance between the respective users' avatars and that of the user of the terminal concerned, the degree of eye contact between them, or similar condition through utilization of the position data and direction-of-eyes data of the respective users' avatars which are received together with their voices; hence, it is possible to create in the virtual space an environment in which all users are allowed to clearly hear sounds and voices all around them, immediately perceive the directions of sounds and voices and understand each other even if their avatars move in the virtual space.

Fifth Embodiment

While the FIG. 23 embodiment lends realism to the virtual space by changing the sound pressure levels of voices of users to be mixed according to the distances and/or directions of eyes of the corresponding avatars relative to that of the user of each particular one of the terminals, it is also possible to request the speech data sending terminal or server to send speech data of specified quality.

Figure 24:
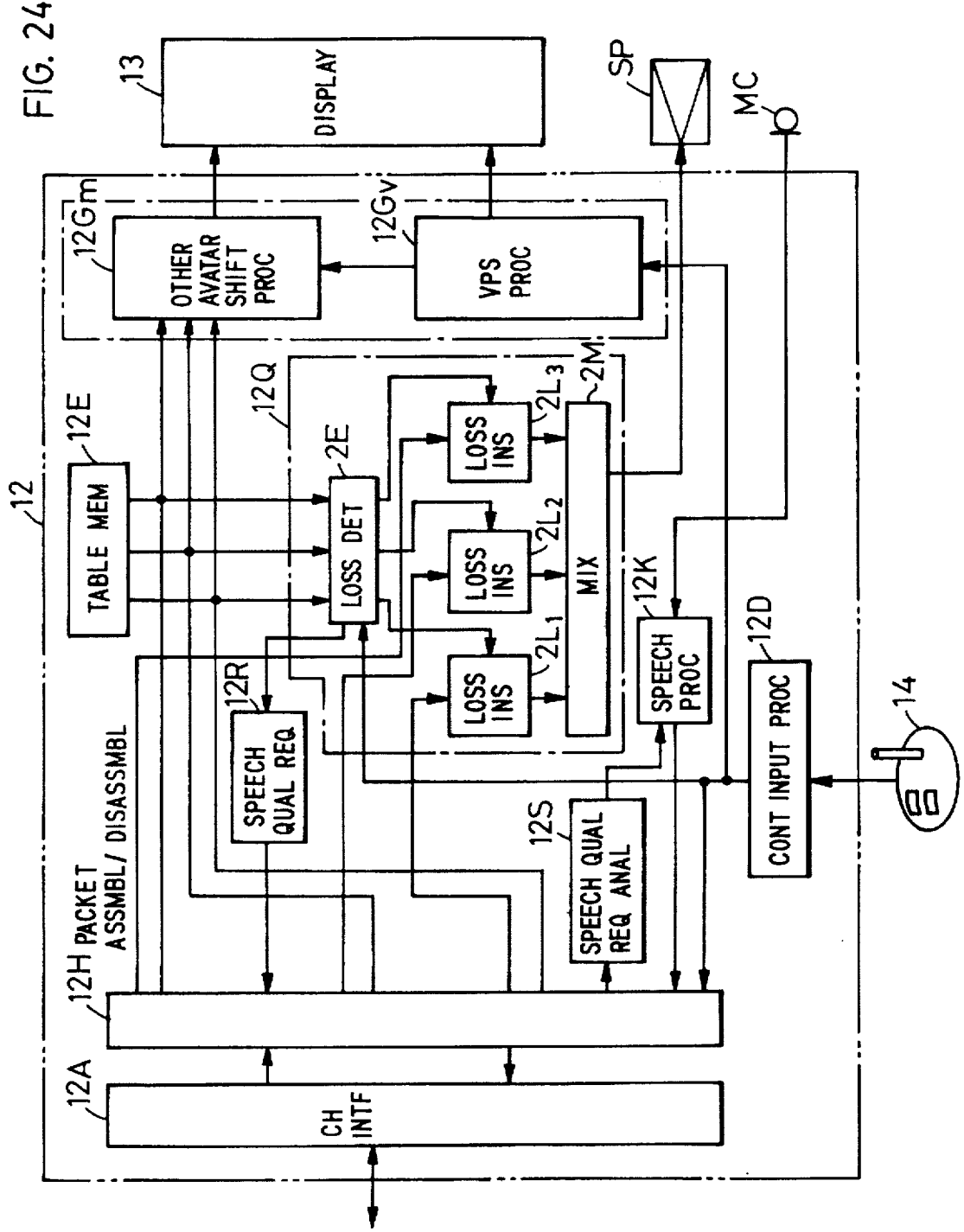
FIG. 24 is a block diagram illustrating another example of the terminal configuration in a fifth embodiment of the present invention which performs speech quality control on demand.

FIG. 24 illustrates another embodiment of the terminal for use in the distributed connection type system as is the case with the FIG. 23 embodiment. According to this embodiment, each user terminal requests the other user terminals to send their voices of speech quality specified on the basis of the position and/or direction-of-eyes relationship between their avatars in FIG. 23. The requested terminals each send speech data of the specified quality to the requesting terminals —this enhances an auditory sense of reality of the mixed speech more than in the above-described embodiments, lending more realism to the virtual space. Furthermore, since the quality of speech data to be sent can be debased according to the circumstances, an average amount of information sent can be reduced; hence, the traffic congestion of the communication network can be eased accordingly.

The FIG. 24 embodiment has a construction in which a speech quality requesting part 12R and a speech quality request analyzing part 12S are added to the FIG. 23 embodiment. The speech quality requesting part 12R is supplied with speech quality determining parameters for respective avatars which are calculated from their position data and/or direction-of-eyes data in a loss determining part 2E to determine losses, such as distances from each avatar to the others; the speech quality determining part 12R determines the necessary speech quality corresponding to each distance and provides the information to a packet assembling and disassembling part 12H. The packet assembling and disassembling part 12H assembles into a packet a signal which requests each terminal to send speech of the determined quality and sends the packet to each terminal via the channel interface part 12A. The speech quality that is defined in terms of distance can be obtained, for example, by changing the transmission rate of speech data. For instance, four distance threshold values $D_1$ to $D_4$ are predetermined which bear the relationship $D_1<D_2<D_3<D_4$. Each avatar requests another avatar with the distance d in the range of $D_4<d \leq D_1$ to send speech data of a 64 Kb/s transmission rate, another avatar with the distance d in the range of $D_1<d \leq D_2$ to send speech data of a 32 Kb/s transmission rate, another avatar with the distance d in the range of $D_3<d \leq D_4$ to send speech data of a 16 Kb/s transmission rate and still another avatar with the distance d in the range of $D_4<D$ to send speech data of an 8 Kb/s transmission rate.

On the other hand, the speech quality requests received from other terminals are analyzed in the speech quality request analyzing part 12S to identify the speech transmission rates requested by the individual terminals and provides the information to the speech processing part 12K. The speech processing part 12K digitally processes speech signal inputted from the microphone MC to convert it into speech data of the requested bit rates, which are provided to the packet assembling and disassembling part 12H. The packet assembling and disassembling part 12H sends the speech data of the respective bit rates as packets addressed to the requesting terminals via the channel interface part 12A.

In the packet assembling and disassembling part 12H, the speech data packets received from the respective terminals in response to the requests of the terminal concerned are disassembled into speech data of the requested bit rates, which are provided to the loss inserting parts $2L_1$, $2L_2$ and $2L_3$, respectively, wherein they are subjected to the same processing as described above in respect of the FIG. 23 embodiment, thereafter being mixed by the mixer 2M and then provided to the speaker SP.

Thus, according to this embodiment, the bit rate (and consequently the speech quality in terms of frequency characteristic) increases as the avatar concerned is approached—this provides enhanced sense of reality more than in the FIG. 23 embodiment. On the other hand, the bit rate of the speech data decreases with distance from the avatar concerned. Hence, the amount of information sent is reduced as a whole and consequently the traffic congestion of the communication network is eased accordingly. This embodiment has been described as being applied to the distributed connection type system; in the case of the centralized connection type system, the same results as described above could be obtained by employing a construction in which the terminal concerned requests the server to send speech data of the specified quality and the server responds to the request to send the speech data received from the respective terminals to the requesting terminal after changing the speech quality (the transmission rate) of the speech data. Alternatively, it is possible to utilize a construction in which the server itself determines the transmission rate of the speech data to be sent to each terminal on the basis of the speech quality determined for the avatar of the terminal as described previously with respect to FIG. 21 and sends the speech data of the determined bit rate.

Sixth Embodiment

While the above embodiments have been described to give the users of the virtual space an auditory sense of reality by controlling the speech quality of other avatars on the basis of the positional relationship between each avatar and the remaining ones, it is also possible to visually lend realism to the virtual space by controlling the image quality of other avatars on the basis of the above-said positional relation. For example, the image quality of facial videos of users is increased as the avatar of the terminal concerned is approached; that is, the closer to the avatar of the terminal user concerned, the higher the image quality of facial videos of other users. A description will be given of embodiments based on this concept.

An embodiment will be described as being applied to the centralized connection type system. As mentioned previously, all the terminals share the virtual space, and hence have the same virtual space model, and each user can freely move in the virtual space. Other users can also move in the same virtual space; to recognize this, each user prepares avatars of other users in his virtual space and sends his facial video and position information of his avatar (position coordinates and direction of eyes in the virtual space) to other terminals. Based on the position information of avatars of other users received therefrom, each user creates their avatars at specified positions in his virtual space and pastes thereto users' facial videos of sizes corresponding to the distances from the avatar of the terminal concerned to the other avatars.

A description will be given of an on-demand type configuration using such a centralized connection type system as shown in FIGS. 2A or 2B. Each user terminal picks up a high quality image of the user with a video camera, digitizes it for each frame and sends it to the server. The server has an image memory corresponding to each user and, upon every reception of a user's image, overwrites and stores it in the image memory. The quality of video image is defined by the number of frames per seconds, resolution (lines/mm), or a combination thereof. The number of frames per second contributes to the smoothness of movement of the video image and the resolution contributes to its definition. In accordance with the distance and/or the degree of eye contact between its avatar and each of the avatars of the other users in the virtual space, each terminal specifies, for each user, a different interval at which to send its video image from the server (the number of frames per second) or different resolution of the video image. The server sends to the requesting terminal the video image of the specified user with the specified resolution and/or the number of frames per second—this permits reduction of the amount of information that is sent throughout the system.

Figure 25:
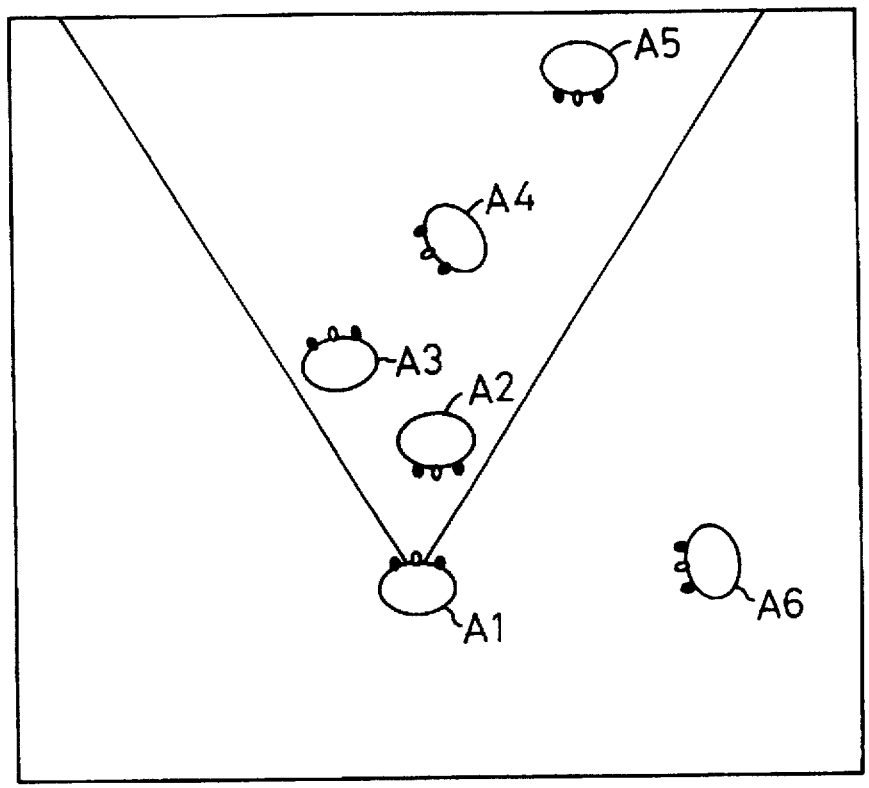
FIG. 25 is a diagram showing an example of classifying the image quality of avatars on the basis of distance in a sixth embodiment of the present invention.

FIG. 25 is a diagram of the virtual space viewed from above, showing how the terminal specifies the quality of the video image that it requests the server to send. In FIG. 25 there is depicted the field of vision of the avatar A1 in the visual space. The avatar A2 is closest to the avatar A1 and also keeps eye contact therewith; hence, for the avatar A2, the terminal of the avatar A1 requests the server to send a video image of the highest quality. Since the avatar A5 is facing the avatar A1 but remains a little out of eye contact with the latter, the terminal requests the server to send a video image of lower quality. As for the avatar A3, the terminal of the avatar A1 requests the server to send a video image of the lowest quality since no eye contact is established between them. The avatar A6 is outside the field of vision of the avatar A1, and consequently, the terminal of the avatar A1 does not request the server to send any video image of the avatar A6.

Figure 26:
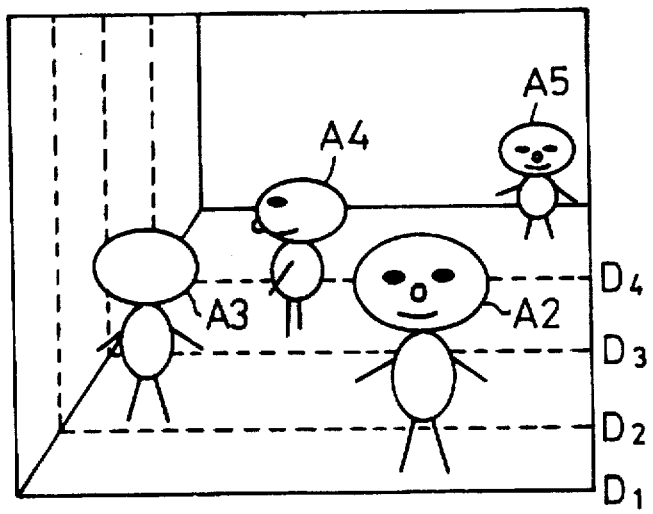
FIG. 26 is a diagram showing a display image which is provided in the case of FIG. 25.

FIG. 26 shows display images of the visual field image that the avatar A1 observes in the virtual space depicted in FIG. 25. The broken lines indicate distance threshold values $D_1$, $D_2$, $D_3$ and $D_4$ relative to the avatar A1 (which are not displayed in practice). The avatar images in respective regions defined by these threshold values are each displayed in the quality determined as described previously.

Figure 27:
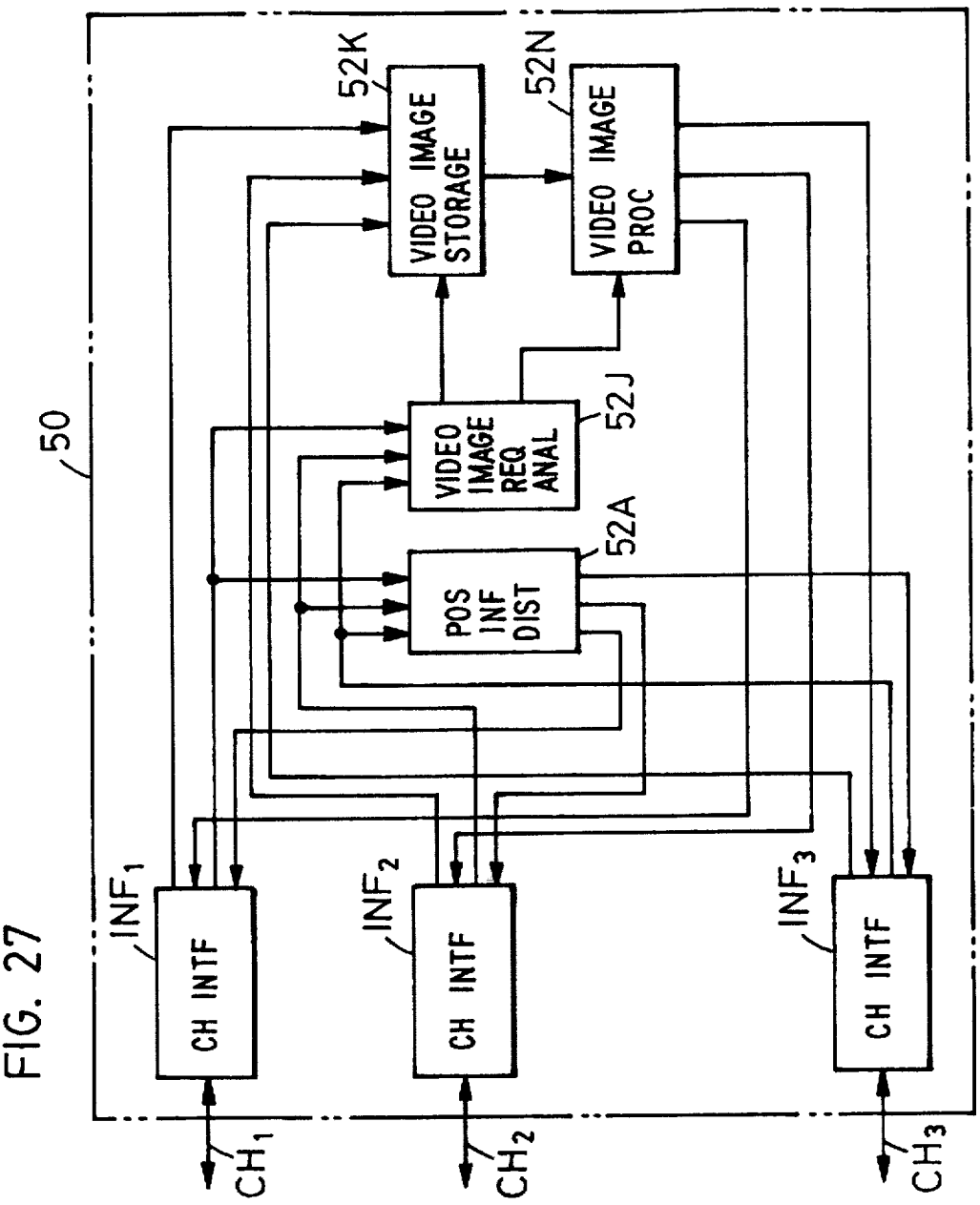
FIG. 27 is a block diagram illustrating the construction of the server in the sixth embodiment.

FIG. 27 illustrates an example of the configuration of the server 50 in the virtual space sharing apparatus of the centralized connection type system. For the sake of brevity, the server 50 is shown to accommodate three terminals and no audio-related parts are shown.

The server 50 sends and receives position information (position coordinates and direction of eyes) and video images to and from the terminals via channels $CH_1$, $CH_2$ and $CH_3$. The data received from the channels $CH_1$, $CH_2$ and $CH_3$ are received in the channel interface parts $INF_1$, $INF_2$ and $INF_3$, respectively. The channel interface parts $INF_1$ to $INF_3$ each analyze the received data and, if it is video image data, transfer it to a video storage part 52K. The video storage part 52K writes the received video image in a memory which stores video images in correspondence with terminals accommodated. When the received data is position information (position coordinates and direction of eyes), the channel interface parts $INF_1$ to $INF_3$ each transfer it to a position information distributing part 52A. The position information distributing part 52A copies the position information received from the channel interface part $INF_1$ and transfers it to the channel interface parts $INF_2$ and $INF_3$; the position information distributing part 52A copies the position information received from the channel interface part $INF_2$ and transfers it to the $INF_1$ and $INF_3$; and the position information distributing part 52A copies the position information received from the channel interface part $INF_3$ and transfers it to the channel interface parts $INF_1$ and $INF_3$. When the received data is image request information, the channel interface parts $INF_1$ to $INF_3$ each transfers it to an image requests analyzing part 52J. The image request analyzing part 52J analyzes the received request and informs the image storage part 52K of the requested image and, at the same time, informs video processing part 52N of the requested resolution and/or the number of frames per second and the requesting terminal. The video storage part 52K reads out of its memory the requested image specified by the image request analyzing part 52N and transfers it to the video processing part 52N. The video processing part 52N converts the video image received from the video storage part 52K to the resolution and/or the number of frames per second specified by the video image request analyzing part 52J and, on the basis of the specified requesting terminal information, sends the video image to the requesting terminal via the channel interface part $INF_1$ and the channel $CH_1$, the channel interface part $INF_2$ and the channel $CH_2$, or the channel interface part $INF_3$ and the channel $CH_3$.

Figure 28:
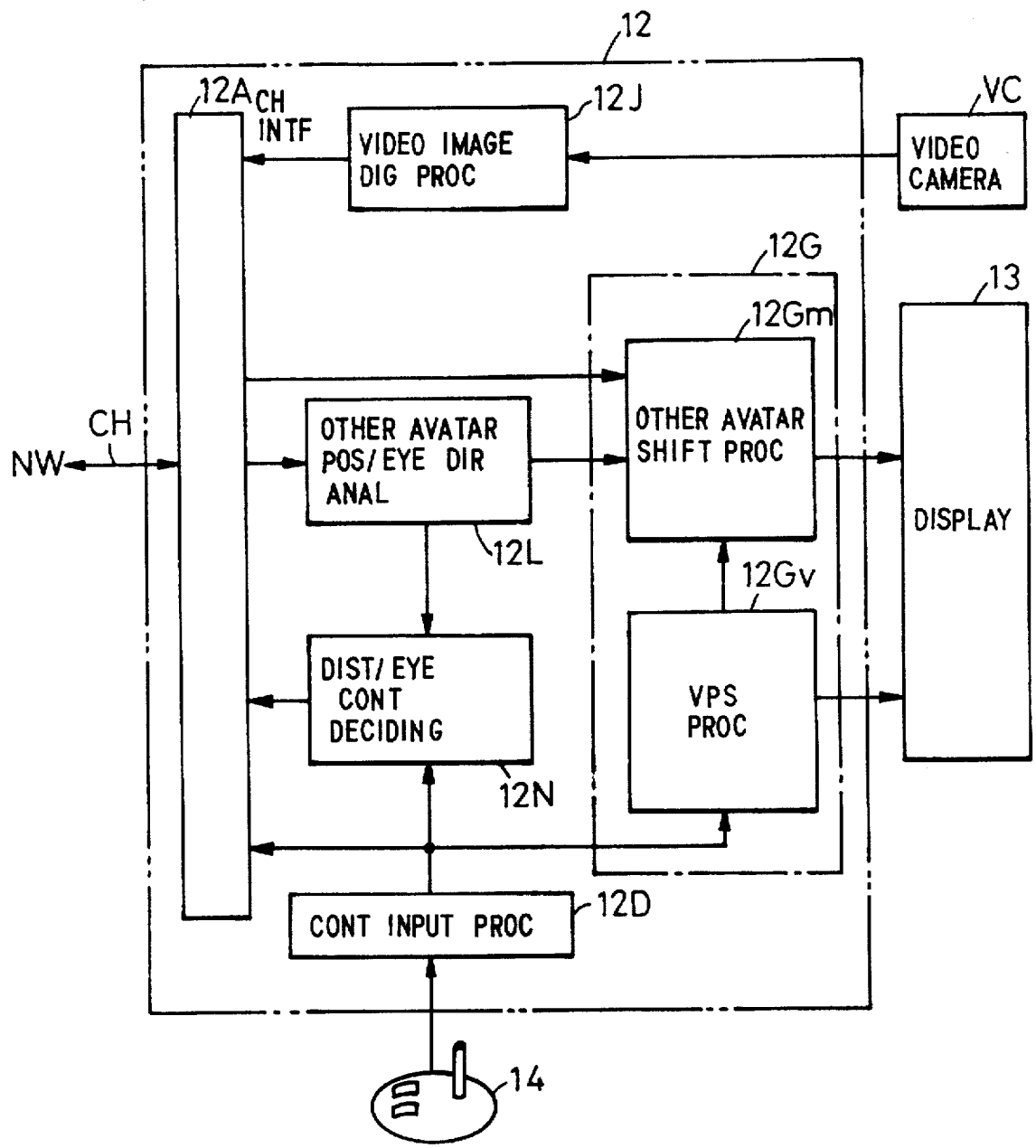
FIG. 28 is a block diagram illustrating the terminal configuration for use in the centralized connection system.

FIG. 28 illustrates an example of the construction of the terminal in the virtual space sharing apparatus of the centralized connection type system. No audio-related parts are shown. The terminal 12 sends and receives video images and position information to and from the server 50 via a communication network NW and a channel CH. At first, the terminal 12 picks up the video image of the user by the video camera VC and transfers it to a digital video processing part 12J. The digital video processing part 12J digitizes the received video image frame by frame and sends it to the server 50 via the channel interface part 12A and the channel CH. When the user changes the position of the viewing point through the control device 14, updated position information (coordinates and direction of eyes) is provided to the control input processing part 12D. The control input processing part 12D sends the position information to the server 50 via the channel interface part 12A and the channel CH. At the same time, the control input processing part 12D send the position information to the viewing point shift processing part 12Gv as well. The viewing point shift processing part 12Gv responds to the updated position information to change the visual field image in the virtual space to be presented to the user and displays it on the display 13. The control input processing part 12D sends move information to a distance/eye contact deciding part 12N. On the other hand, when the received data is position information, the channel interface part 12A transfers it to an other avatar position and direction-of-eyes analyzing part 12L. The other avatar position and direction-of-eyes analyzing part 12L transfers position coordinates and directions of eyes of other avatars to an other avatar shift processing part 12Gm and the distance/eye contact deciding part 12N, respectively. The distance/eye contact deciding part 12N operates in the same manner as do the distance decision part 52B and the eye contact deciding part 52C described previously with respect to FIGS. 10 and 11. That is, based on the position information of the user's avatar received from the control input processing part 12D and the other avatar move information received from the other avatar position and direction-of-eyes analyzing part 12L, the distance/eye contact deciding part 12N decides the distance and/or eye contact between the user and each of the other avatars, then decides the image quality for the avatar by the method described previously in respect of FIG. 25 and requests the server 50 via the channel interface part 12A and the channel CH to send the video image of the specified quality. In this instance, it is also possible to employ the method described previously with respect to FIG. 19; that is, as the angle θ between the direction EL of eyes of the avatar of the user and each avatar increases, the resolution and/or the number of frames per time is reduced. Alternatively, the method described in respect of FIG. 20 may also be used; that is, as the sum of angles α and β between the directions of eyes of the two avatars and the straight line joining them increases, the resolution and/or the number of frames per time is reduced.

When the received data is video data, the channel interface part 12A transfers it to the other avatar move processing part 12Gm. Based on the position information of other avatars received from the other avatar position and direction-of-eyes analyzing part 12L, the other avatar shift processing part 12Gm changes the position and direction of eyes of each avatar, then pastes the video image (facial videos) received from the channel interface part 12A to the corresponding. avatar in a size corresponding to the distance from the user's viewing point to the avatar, then converts the avatar image to the position viewed from the user's viewing point and displays it on the display 13.

Figure 29:
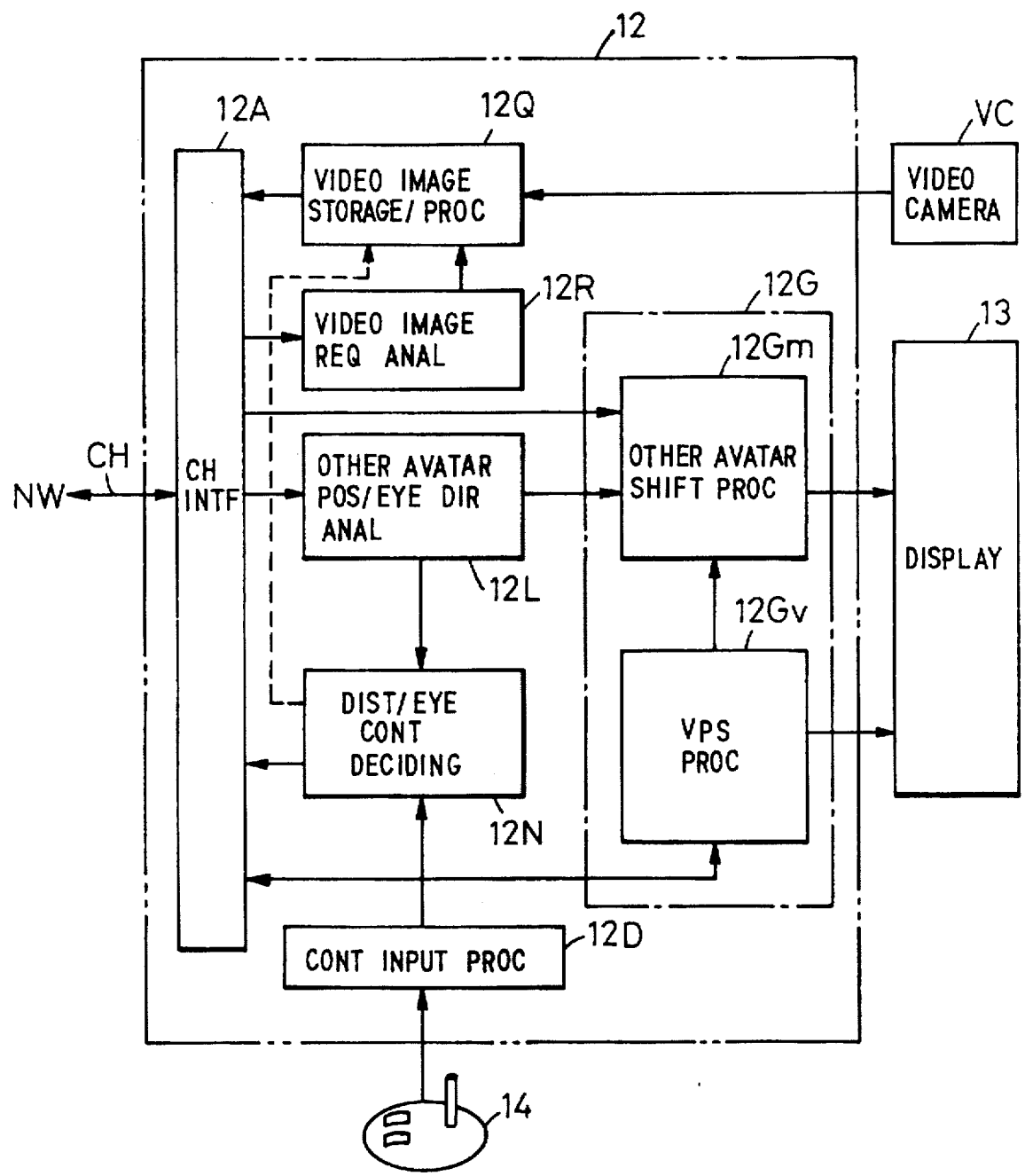
FIG. 29 is a block diagram illustrating the terminal configuration for use in the distributed connection type system.

FIG. 29 illustrates an example of the configuration of the terminal in the virtual space sharing apparatus of the distributed connection type system. This example differs from the FIG. 28 example in that the terminal 12 directly sends and receives video data and position information (position coordinates and direction of eyes) to and from other terminals via the communication network NW and the channel CH. To send video images of the quality specified by other terminals, each terminal is provided with a video storage and processing part 12Q and a video request analyzing part 12R in place of the digital video processing part 12J. The video camera VC picks up video of the user and transfers it to the video storage and processing part 12Q. The video storage and processing part 12Q digitizes the received video image on a framewise basis and stores it. When the received data is video image request information, the channel interface part 12A transfers the request information to the video request analyzing part 12R. The video request analyzing part 12R analyzes the received request and informs the image storage and processing part 12Q of the requested resolution and the requesting terminal. The video storage and processing part 12Q converts its stored video image to the specified resolution and/or number of frames per time and sends it to the requesting terminal via the channel interface 12A and the channel CH. The other arrangements and operations are the same as in the FIG. 27 example, and hence no description will be given of them.

As described above, according to the embodiments of FIGS. 27, 28 and 29, each terminal in the distributed connection type system or the server in the centralized connection type system stores high-quality video of each user in its memory and, only when requested by each terminal, sends the video in specified quality. Hence, these embodiments effectively avoid the traffic congestion of the communication network and lessen the burden of processing for receiving video images at the terminal, resulting in the effect of preventing degradation of image quality.

In the above, the on-demand system has been described, but when the on-demand system is not utilized, since in the centralized connection type systems of FIGS. 27 and 28 the latest position information of avatars of all terminals is stored in the position information distributing part 52A of the server 50 in FIG. 27, the distances between the avatar of each terminal and the avatars of the other terminals are calculated through the use of the stored position information, then the levels of resolution and/or the numbers of frames per second of the video images to be sent to each terminal from the others are determined according to the distances between them, and the video images are processed in the video processing part 52K accordingly. In this instance, the distance/eye contact decision part 12N need not be provided in the terminal of FIG. 28. In the case of the distributed connection type system, the levels of image quality of the avatar of each terminal user relative to the avatars of the other users are determined in the distance/eye contact deciding part 12N on the basis of the relationship between the position information of the avatars of the other users received in the terminal of FIG. 29 from the other terminals and the position information of the avatar of the user of this terminal, and the video image of the terminal user is sent at the determined levels of quality from the video storage and processing part 12Q to the other terminals, respectively. Also in this instance, the video image request analyzing part 12R is not needed and, as indicated by the broken line, the distance/eye contact decision part 12N informs the video storage and processing part 12Q of the determined image quality.

It will be apparent that many modifications and variations may be effected without departing from the scope of the novel concepts of the present invention.

What is claimed is:

1. A virtual space sharing apparatus which has a plurality of terminals connected to a communication network and sharing a predetermined common virtual space and generates a displays a visual field image which changes as an avatar representing a user of each terminal moves in said virtual space at said each terminal, said each terminal comprising:

control means which generates signals for selectively specifying its position and direction of eyes in said virtual space;

visual field image generating means which generates a visual field image in said direction of eyes in said virtual space from said position as a viewing point;

position information sending and receiving means which sends said position and said direction of eyes as position information to said communication network and receives therefrom position information sent from other terminals;

avatar image forming means which forms avatar images representative of users of said other terminals in said visual field at positions corresponding to said received position information;

display means which displays a combined image containing said visual field image and said avatar images; and server means connected to said each terminal via said communication network, said each terminal comprising speech sending and receiving means for sending speech data of its user to said server means via said communication network and for receiving speech data of said users of said other terminals from said server means and speech output means for outputting said received speech data as speech;

said server means comprising:

select means which calculates, from position information received from said terminals, the distances between said avatar of the user of said each terminal and other avatars and selects those of said other avatars which have said distance within a predetermined threshold value; and mixer means which, in a group consisting of any one of said avatars and said avatars selected by said select means relative thereto, mixes speech data from the terminals corresponding to said avatars except each particular one and sends said mixed speech data to the terminal corresponding to said each particular avatar.

2. A virtual space sharing apparatus which has a plurality of terminals connected to a communication network and sharing a predetermined common virtual space and generates and displays a visual field image which changes as an avatar representing a user of each terminal moves in said virtual space at said each terminal, said each terminal comprising:

control means which generates signals for selectively specifying its position and direction in eyes in said virtual space;

visual field image generating means which generates a visual field image in said direction of eyes in said virtual space from said position as a viewing point;

position information sending and receiving means which sends said position and said direction of eyes as position information to said communication network and receives therefrom position information sent from other terminals;

avatar image forming means which forms avatar images representative of users of said other terminals in said visual field at positions corresponding to said received position information; and display means which displays a combined image containing said visual field image and said avatar images;

said terminals being interconnected via said communication network, and each of said terminals comprising:

speech sending and receiving means which sends speech data of its user to all the other terminals via said communication network and receives therethrough speech data of users of said other terminals;

select means which calculates, from position information received from said other terminals, the distances between the avatar of the user of said each terminal and said other avatars and selects those of said other avatars which have said distance within a predetermined threshold value;

mixer means which mixes speech data received from the terminals corresponding to said avatars selected by said select means and outputs the mixed speech data; and speech output means for outputting said mixed speech data as a sound.

3. A virtual space sharing apparatus which has a plurality of terminals connected to a communication network and sharing a predetermined common virtual space and generates and displays a visual field image which changes as an avatar representing a user of each terminal moves in said virtual space at said each terminal, said each terminal comprising:

control means which generates signals for selectively specifying its position and direction of eyes in said virtual space;

visual field image generating means which generates a visual field image in said direction of eyes in said virtual space from said position as a viewing point;

position information sending and receiving means which sends said position and said direction of eyes as position information to said communication network and receives therefrom position information sent from other terminals;

avatar image forming means which forms avatar images representative of users of said other terminals in said visual field at positions corresponding to said received position information;

display means which displays a combined image containing said visual field image and said avatar images; and server means connected to said each terminal via said communication network, said each terminal comprising speech sending and receiving means for sending speech data of its user to said server means via said communication network and for receiving speech data of said users of said other terminals from said server means and speech output means for outputting said received speech data as speech;

said server means comprising:

first mixer means which mixes speech data received from terminals corresponding to all of said avatars and outputs environment sound data;

conversation monitor means which, on the basis of position information received from each of said terminals, searches for a group of avatars which mutually satisfy a conversation enable condition;

second mixer means which generates, for the terminal of each avatar or said group, mixed sound data by mixing speech data received from the terminal corresponding to the other avatar of said group and said environment sound data; and means which sends said mixed sound data to said terminal of said each avatar.

4. A virtual space sharing apparatus which has a plurality of terminals connected to a communication network and sharing a predetermined common virtual space and generates and displays a visual field image which changes as an avatar representing a user of each terminal moves in said virtual space at said each terminal, said each terminal comprising:

control means which generates signals for selectively specifying its position and direction of eyes in said virtual space;

visual field image generating means which generates a visual field image in said direction of eyes in said virtual space from said position as a viewing point;

position information sending and receiving means which sends said position and said direction of eyes as position information to said communication network and receives therefrom position information sent from other terminals;

avatar image forming means which forms images representative of users of said other terminals in said visual field at positions corresponding to said received position information; and display means which displays a combined image containing said visual field image and said avatar images;

said terminals being interconnected via said communication network and each of said terminals comprising:

speech sending and receiving means which sends speech data of its user to all the other terminals via said communication network and receives therethrough speech data of users of said other terminals;

conversation monitor means which, on the basis of position information received from said other terminals, searches for a group of avatars which satisfy a conversation enable condition with respect to the avatar of the user of said each terminal;

first mixer means which mixes speech data received from terminals corresponding to all of said avatars and outputs environment sound data;

second mixer means which mixes speech data received from the terminals corresponding to said avatars of said group and said environment sound data to generate mixed speech data; and speech output means for outputting said mixed speech data as a sound.

5. A display method for a virtual space which has a plurality of terminals connected to a communication network and sharing a predetermined common virtual space and generates and displays a visual field image which changes as an avatar representing a user of each terminal moves in said virtual space at said each terminal, said each terminal performing the steps of:

(a) generating signals for selectively specifying its position and direction of eyes in said virtual space;

(b) sending said position and said direction of eyes as position information to said communication network;

(c) generating a visual field image in said direction of eyes in said virtual space from said position as a viewing point;

(d) receiving, from said communication network, position information sent thereto from other terminals;

(e) forming avatar images representative of users of said other terminals in said visual field at positions corresponding to said received position information; and (f) displaying a combined image containing said visual field image and said avatar images;

server means being provided which is connected via said communication network to said terminals, respectively, said step (b) including a step of sending speech data of the user of said each terminal to said server means via said communication network, and said step (d) including a step of receiving speech data of other terminals from said server means and outputting said received speech data as speech;

said server means performing the steps of:

(g) calculating, from position information received from said other terminals, the distances between said avatar of the user of said each terminal and the avatars of said other terminals and selecting those of said avatars of said other terminals which have said distance within a predetermined threshold value; and (h) mixing, in a group consisting of any one of said avatars and said avatars selected relative thereto, speech data from the terminals corresponding to said avatars except each particular one and sending said mixed speech data to the terminal corresponding to said each particular avatar.

6. A display method for a virtual space which has a plurality of terminals connected to a communication network and sharing a predetermined common virtual space and generates and displays a visual field image which changes as an avatar representing a user of each terminal moves in said virtual space at said each terminal, said each terminal performing the steps of:

(a) generating signals for selectively specifying its position and direction of eyes in said virtual space;

(b) sending said position and said direction of eyes as position information to said communication network;

(c) generating a visual field image in said direction of eyes in said virtual space from said position as a viewing point;

(d) receiving, from said communication network, position information sent thereto from other terminals;

(e) forming avatar images representative of users of said other terminals in said visual field at positions corresponding to said received position information; and (f) displaying a combined image containing said visual field image and said avatar images;

said terminals being interconnected via said communication network, said step (b) including a step of sending speech data of the user of said each terminal to all the other terminals via said communication network and said step (d) including a step of receiving therethrough speech data of the users of said other terminals via said communication network;

said each terminal performing the steps of:

(g) selecting, from position information received from said other terminals, the distances between the avatar of the user of said each terminal and the avatars of said other terminals and selecting those of the avatars of said other terminals which have said distance within a predetermined threshold value; and (h) mixing speech data received from the terminals corresponding to said selected avatars and outputting the mixed speech data as a sound.

7. A display method for a virtual space which has a plurality of terminals connected to a communication network and sharing a predetermined common virtual space and generates and displays a visual field image which changes as an avatar representing a user of each terminal moves in said virtual space at said each terminal, said each terminal performing the steps of:

(a) generating signals for selectively specifying its position and direction of eyes in said virtual space;

(b) sending said position and said direction of eyes as position information to said communication network;

(c) generating a visual field image in said direction of eyes in said virtual space from said position as a viewing point;

(d) receiving, from said communication network, position information sent thereto from other terminals;

(e) forming avatar images representative of users of said other terminals in said visual field at positions corresponding to said received position information; and (f) displaying a combined image containing said visual field image and said avatar images;

wherein server means is provided which is connected via said communication network to said terminals, respectively, said step (b) including a step of sending speech data of the user of said each terminal to said server means via said communication network, and said step (d) including a step of receiving speech data of other terminals from said server means and outputting said received speech data as speech;

said server means performing the steps of:

(g) mixing speech data received from terminals corresponding to said avatars to generate environment sound data;

(h) searching for a group of avatars which mutually satisfy a conversation enable condition on the basis of the position information received from said other terminals;

(i) generating mixed sound data by mixing speech data received from the terminals corresponding to the avatars of said group other than each one of them and said environment sound data; and (j) sending said mixed sound data, generated for the terminal of said each avatar, to said terminal.

8. A display method for a virtual space which has a plurality of terminals connected to a communication network and sharing a predetermined common virtual space and generates and displays a visual field image which changes as an avatar representing a user of each terminal moves in said virtual space at said each terminal, said each terminal performing the steps of:

(a) generating signals for selectively specifying its position and direction of eyes in said virtual space;

(b) sending said position and said direction of eyes as position information to said communication network;

(c) generating a visual field image in said direction of eyes in said virtual space from said position as a viewing point;

(d) receiving, from said communication network, position information sent thereto from other terminals;

(e) forming avatar images representative of users of said other terminals in said visual field at positions corresponding to said received position information; and (f) displaying a combined image containing said visual field image and said avatar images;

wherein said terminals are interconnected via said communication network, said step (b) including a step of sending speech data of the user of said each terminal to all the other terminals via said communication network and said step (d) includes a step of receiving speech data of the users of said other terminals via said communication network;

said each terminal performing the steps of:

(g) mixing speech data received from terminals corresponding to said avatars to generate environment sound data;

(h) searching for a group of avatars which mutually satisfy a conversation enable condition on the basis of the position information received from said other terminals;

(i) generating mixed sound data by mixing speech data received from the terminals corresponding to the avatars of said group other than each one of them and said environment sound data and (j) outputting said mixed sound data as a sound.

9. The apparatus of claim 1 or 2, wherein said select means is means which selects, for each avatar, those of the other avatars whose distances therefrom are within said threshold value and which are present in the field of vision of said each avatar.

10. The apparatus of claim 9, wherein said select means is means which additionally selects that one of the other avatars which is outside of the field of vision of said each avatar but inside of the field of vision of any one of said selected avatars and provides speech data from said additionally selected avatar to said mixer means.

11. The apparatus of claim 1 or 2, wherein said select means is means which selects, for each avatar, those other avatars whose distances therefrom is within said threshold value and which are each present in the field of vision of the other.

12. The apparatus of claim 11, wherein said select means is means which additionally selects that one of the other avatars which is outside of the field of vision of said each avatar but inside of the field of vision of any one of said selected avatars and provides speech data from said additionally selected avatar to said mixer means.

13. The apparatus of claim 3 or 4, wherein said conversation monitor means presents, as said conversation enable condition, at least one condition that the distance between the avatar of the user of said each terminal and the other avatar in said group, calculated from position information received from said terminals, is within a predetermined threshold value.

14. The apparatus of claim 13, wherein said conversation enable condition includes a condition that said other avatar is inside of the field of vision of said avatar of the user of said each terminal.

15. The apparatus of claim 3 or 4, which further comprises channel switching means which one-way connects speech data received from all of said terminals to said first mixer means, two-way connects to said second mixer means speech data received from said avatars of said group and one-way connects an environment sound data outputted from said first mixer means to said second mixer means.

16. The apparatus of claim 3 or 4, which further comprises loss inserting means which inserts a loss into said environment sound data outputted from said first mixer means and provides it to said second mixer means.

17. A virtual space sharing apparatus which has a plurality of terminals connected to a communication network and sharing a predetermined common virtual space and generates and displays a visual field image which changes as an avatar representing a user of each terminal moves in said virtual space at said each terminal, said each terminal comprising:

sending and receiving means which receives speech data of users of said terminals except said each terminal and position information of their avatars and sends speech data of the user of said each terminal and position information of its avatar to said terminals;

speech quality determining means which determines the levels of quality for speech data of other users in accordance with the relationship of the avatars of said other users to the avatar of said each user through the use of position information of said avatars of said other users received from said other terminals;

speech quality control means which controls the quality of speech data of said other users in accordance with the levels of quality determined therefor relative to the avatar of said each user;

mixer means which mixes said quality-controlled speech data of said other users in correspondence with said each user and outputs mixed sound data; and acoustic signal output means which outputs said mixed sound data from said mixer means as an acoustic signal.

18. A virtual space sharing apparatus which has a plurality of terminals connected to a server and sharing a predetermined common virtual space and generates and displays a visual field image which changes as an avatar representing a user of each terminal moves in said virtual space at said each terminal, said server comprising:

sending and receiving means which receives speech data of users of said terminals except said each terminal and position information of their avatars and sends speech data of the user of said each terminal and position information of its avatar to said terminals;

speech and position information distributing means which distributes speech data of the user and position information of its avatar, received from said each terminal, to all the other terminals via said sending and receiving means;

speech quality determining means which determines the speech quality for speech data of other users in accordance with the relationship of the avatars of said other users to the avatar of said each user through the use of position information of said avatars of said other users received from said other terminals;

speech quality control means which controls the speech quality of speech data of said other users in accordance with the speech quality determined therefor relative to the avatar of said each user; and mixer means which mixes said quality-controlled speech data of said other users in correspondence with said each user and outputs mixed sound data;

wherein said mixed sound data is sent via said sending and receiving means to corresponding ones of said terminals.

19. The apparatus of claim 17 or 18, wherein said position information of said avatar includes its position coordinate and said speech quality determining means is means which determines the speech quality of each of said other users so that its speech quality becomes lower with an increase in the length of a straight line joining the position coordinate of the avatar of said each user and the position coordinate of the avatar of an other user.

20. The apparatus of claim 17 or 18, wherein said position information of said avatar includes its position coordinate and direction of eyes and said speech quality determining means is means which determines the speech quality of each of said other users, through utilization of said position coordinate and direction of eyes of the avatar of said each user, so that the speech quality of an other user is high or low, depending on whether its avatar is in the field of vision of the avatar of said each user.

21. The apparatus of claim 17 or 18, wherein said position information of said avatar includes its position coordinate and direction of eyes and said speech quality determining means determines the speech quality of each of said other users, through utilization of the position coordinates and direction of eyes of said each user and each of said other users, so that the speech quality of each of said other users becomes lower with an increase in the angle between a straight line joining the coordinates of the avatar of said each user and each of said other users and the direction of eyes of the avatar of each of said other users.

22. The apparatus of claim 17 or 18, wherein said position information of said avatar includes its position coordinate and direction of eyes and said speech quality determining means is means which determines the speech quality of each of said other users so that said speech quality becomes lower with an increase in the sum of the angles of rotation of the directions of eyes of the avatars of said each user and each of said other users to a straight line joining their coordinates.

23. The apparatus of claim 17, in which said each terminal further comprises: means which send to the terminal of each of said other users a quality request signal requesting said speech quality determined therefor; and speech data processing means which responds to said quality request signal from each of said other users to send thereto the speech data of said each terminal at a transmission rate specified by said quality request signal.

24. The apparatus of claim 18, wherein said sending and receiving means of said server means sends said mixed sound data to said each terminal at a transmission rate corresponding to said speech quality determined for the avatar of said each terminal.

25. A virtual space sharing apparatus which has a plurality of terminals connected to a server and sharing a predetermined common virtual space and generates and displays a visual field image which changes as an avatar representing a user of each terminal moves in said virtual space at said each terminal, wherein said each terminal comprises: sending and receiving means which receives video image data of each of other users and position information of its avatar from said server means and sends video image data of the user of said each terminal and position information of its avatar to said server; camera means which picks up the video image of said user of said each terminal and outputs a video signal; digital processing means which digitally process, said video signal and sends it to said server means via said sending and receiving means; quality specifying and video requesting means which determines the image quality for the avatar of each of said other users on the basis of the relationship between the position information of the avatar of each of said other users and the position information of the avatar of said each user and sends via said sending and receiving means to said server means a video request signal requesting a video image of said determined quality; and means which generates an avatar image on the basis of the video image data of each of said other users received from said server means and displays it in a visual field image of said each user at a position specified by the position information of the avatar of each of said other users; and wherein said server means comprises: position information distributing means which sends position information of the avatar of the user, received from said each terminal, to all the other terminals; video memory means which stores video image data in correspondence with said terminals; means which writes received video image data into said video memory means; and quality processing means which analyzes a video image request signal received from each of said other users, then reads out the requested video image data from said video memory means and sends it to a requesting terminal after processing it to have specified quality.

26. A virtual space sharing apparatus which has a plurality of terminals connected to a server and sharing a predetermined common virtual space and generates and displays a visual field image which changes as an avatar representing a user of each terminal moves in said virtual space at said each terminal, said each terminal comprising:
sending and receiving means which receives video image data of the users of other terminals and position information of their avatars and sends to said other terminals the video image of the user of said each terminal and position information of its avatar;

quality specifying and video requesting means which determines the image quality for the avatar of each of said other users on the basis of the relationship between the position information of the avatar received from each of said other terminals and the position information of the avatar of said each terminal and sends via said sending and receiving means to each of said other terminals a video request signal requesting a video image of said determined quality;

video memory means which stores video data;

camera means which picks up the video image of the user of said each terminal;

video processing means which digitally processes said video signal and writes it into said video memory means;

means which analyzes a video image request signal received from each of said other users, then reads out the requested video image data from said video memory means and sends it to a requesting terminal after processing it to have specified quality;

and means which generates an avatar image on the basis of the video image data received from each of said other terminals and displays it in a visual field image of said each user at a position specified by the position information received from each of said other terminals.

27. The apparatus of claim 25 or 26, wherein said position information of said avatar includes its position coordinate, and said quality specifying and video requesting means includes means which determines the image quality of each of said other users so that its image quality becomes lower with an increase in the length of a straight line joining the position coordinate of the avatar of the user of said each terminal and the position coordinate of the avatar of each of said other users in the field of vision of the former.

28. The apparatus of claim 25 or 26, wherein the position information of said avatar includes its position coordinate, and said quality specifying and video image requesting means includes means which determines the image quality of each of said other users so that said image quality becomes lower with an increase in the angle between the direction of eyes of the avatar of the user of each terminal and the position of the avatar of each of said other users in the field of vision of the former.

29. The apparatus of claim 25 or 26, wherein said position information of said avatar includes its position coordinate and direction of eyes, and said quality specifying and video image requesting means includes means which determines the image quality of each of said other users so that said image quality becomes lower with an increase in the sum of the angles of rotation of the directions of eyes of the avatar of the user of said each terminal and the avatar of each of said other users to a straight line joining their coordinates in the field of vision of the avatar of the user of said each terminal.

30. A virtual space sharing apparatus which has a plurality of terminals connected to a server and sharing a predetermined common virtual space and generates and displays a visual field image which changes as an avatar representing a user of each terminal moves in said virtual space at said each terminal, wherein said each terminal comprises: sending and receiving means which receives video image data of each of other users and position information of its avatar from said server means and sends video image data of the user of said each terminal and position information of its avatar to said server; camera means which picks up the video image of said user of said each terminal and outputs a video signal; digital processing means which digitally processes said video signal and sends it to said server means via said sending and receiving means; and means which generates an avatar image on the basis of the video image data of each of said other users received from server means and displays it in a visual field image of said avatar of the user of said each terminal at a position specified by the position information of the avatar of each of said other users; and wherein said server means comprises: position information distributing means which sends position information of the avatar of the user of said each terminal received therefrom to all the other terminals; image quality determining means which determines the image quality for the avatar of the user of each of said other terminals on the basis of the relationship between the position information of the avatar of the user of said each terminal and the position information of the avatar of the user of each of said other users; video memory means which stores video image data in correspondence with said terminals; means which writes received video image data into said video memory means; and quality processing means which reads out of said video memory means said video image data of each of said terminals received therefrom, and sends it to a requesting terminal after processing it to have said determined quality.

31. A virtual space sharing apparatus which has a plurality of terminals connected to a server and sharing a predetermined common virtual space and generates and displays a visual field image which changes as an avatar representing a user of each terminal moves in said virtual space at said each terminal, said each terminal comprising:
sending and receiving means which receives video image data of the users of other terminals and position information of their avatars and sends to said other terminals the video image of the user of said each terminal and position information of its avatar;
image quality determining means which determines the image quality for the avatar of the user of said each terminal relative to the avatar of each of said other users on the basis of the relationship between the position information of the avatar received from each of said other terminals and the position information of the avatar of the user of said each terminal and sends via said sending and receiving means to each of said other terminals video image data of said determined quality;
camera means which picks up the video image of the user of said each terminal and outputs a video signal;
video memory means which stores said video signal;
video processing means which digitally processes said video signal and writes it into said video memory means;
digital processing means which processes video image data of each of said other users read out of said video memory means to have said determined quality and sends it via said sending and receiving means to each of said other terminals;
and means which generates an avatar image on the basis of the video image data received from each of said other terminals and displays it in a visual field image of the avatar of said each terminal at a position specified by the position information received from each of said other terminals.

32. The apparatus of claim 30, wherein said position information of said avatar includes its position coordinate and direction of eyes, and said image quality determining means includes means which determines the image quality of each of said other users so that its image quality becomes lower with an increase in the length of a straight line joining the position coordinate of the avatar of the user of said each terminal and the position coordinate of the avatar of each of said other users in the field of vision of the former.

33. The apparatus of claim 31, wherein said position information of said avatar includes its position coordinate and direction of eyes, and said image quality determining means includes means which determines the image quality of each of said other users so that its image quality becomes lower with an increase in the length of a straight line joining the position coordinate of the avatar of the user of said each terminal and the position coordinate of the avatar of each of said other users in the field of vision of the former.

34. The method of claim 5 or 6, wherein said step (g) includes a step of selecting, for each avatar, those of the other avatars whose distances therefrom are within said threshold value and which are present in the field of vision of said each avatar.

35. The method of claim 34, wherein said step (g) includes a step of additionally selecting that one of the other avatars which is outside of the field of vision of said each avatar but inside of the field of vision of any one of said selected avatars.

36. The method of claim 5 or 6, wherein said step (g) includes a step of selecting, for each avatar, those other avatars whose distances therefrom is within said threshold value and which are each present in the field of vision of the other.

37. The method of claim 36, wherein said step (g) includes a step of additionally selecting that one of the other avatars which is outside of the field of vision of said each avatar but inside of the field of vision of any one of said selected avatars.

38. The method of claim 7 or 8, wherein said conversation enable condition in said step (h) includes at least one condition that the distance between the avatar of the user of said each terminal and the other avatar in said group, calculated from position information received from said terminals, is within a predetermined threshold value.

39. The method of claim 38, wherein said conversation enable condition includes a condition that said other avatar is inside of the field of vision of said avatar of the user of said each terminal.

40. The method of claim 7 or 8, wherein said step (i) includes a step of inserting a loss in said environment sound data and then mixing it with said received speech data.

41. A display method for a virtual space which has a plurality of terminals connected to a communication network and sharing a predetermined common virtual space and generates and displays a visual field image which changes as an avatar representing a user of each terminal moves in said virtual space at said each terminal, said each terminal performing the steps of:

(a) receiving speech data of the users and position information of their avatars from the other terminals;

(b) sending speech data of the avatar of said each terminal and position information of its avatar to each of said other terminals;

(c) determining the levels of quality for speech data of the users of said other terminals in accordance with the relationship of the avatars of the users of said other terminals to the avatar of the user of said each terminal through the use of position information of said avatars of said other users received from said other terminals;

(d) controlling the quality of speech data of said other users in accordance with the levels of quality determined therefor relative to the avatar of said each user; and (e) mixing said quality-controlled speech data of said other users in correspondence with said each user and outputting mixed sound data as acoustic signal.

42. A display method for a virtual space which has a plurality of terminals connected to server means and sharing a predetermined common virtual space and generates and displays a visual field image which changes as an avatar representing a user of each terminal moves in said virtual space at said each terminal, said each server means performing the steps of:

(a) receiving speech data of the users and position information of their avatars from the other terminals;

(b) sending to each terminal speech data and position information of their avatars;

(c) distributing the speech data of the user and position information of its avatar received from said each terminal to all the other terminals;

(d) determining the levels of quality for speech data of the users of said other terminals in accordance with the relationship of the avatars of the users of said other terminals to the avatar of the user of said each terminal through the use of position information of said avatars of said other users received from said other terminals;

(e) controlling the quality of speech data of said other users in accordance with the levels of quality determined therefor relative to the avatar of said each user; and (f) mixing said quality-controlled speech data of said other users in correspondence with said each user and outputting and sending mixed sound data to said terminals corresponding thereto.

43. The apparatus of claim 41 or 42, wherein said position information of said avatar includes its position coordinate and said speech quality determining step includes a step determining the speech quality of each of said other users so that its speech quality becomes lower with an increase in the length of a straight line joining the position coordinate of the avatar of said each user and the position coordinate of the avatar of said other user.

44. The method of claim 41 or 42, wherein said position information of said avatar includes its position coordinate and direction of eyes and said speech quality determining step includes a step of determining the speech quality of each of said other user, through utilization of said position coordinate and direction of eyes of the avatar of said each user, so that the speech quality of said other user is high or low, depending on whether its avatar is in the field of vision of the avatar of said each user.

45. The method of claim 41 or 42, wherein said position information of said avatar includes its position coordinate and direction of eyes and said speech quality determining step includes a step of determining the speech quality of each of said other users, through utilization of the position coordinates and direction of eyes of said each user and each of said other user, so that the speech quality of each of said other users becomes lower with an increase in the angle between a straight line joining the coordinates of the avatar of said each user and each of said other users and the direction of eyes of the avatar of each of said other users.

46. The method of claim 41 or 42, wherein said position information of said avatar includes its position coordinate and direction of eyes and said speech quality determining step includes a step of determining the speech quality of each of said other users so that said speech quality becomes lower with an increase in the sum of the angles of rotation of the directions of eyes of the avatars of said each user and each of said other users to a straight line joining their coordinates.

47. The method of claim 41, in which said each terminal further performs the steps of: sending to the terminal of each of said other users a quality request signal requesting said speech quality determined therefor; and responding to said quality request signal from each of said other users to send thereto the speech data of said each terminal at a transmission rate specified by said quality request signal.

48. The method of claim 42, wherein said server means further performs a step of sending said mixed sound data to each of said other terminals at a transmission rate corresponding to said speech quality determined for the avatar thereof.

49. A display method for a virtual space which has a plurality of terminals connected to a server via a communication network and sharing a predetermined common virtual space and generates and displays a visual field image which changes as an avatar representing a user of each terminal moves in said virtual space at said each terminal, wherein said each terminal performs the steps of:

(a) picking up the video image of the user of said each terminal, digitally processing the video signal and sending the video image data of said user to said server;

(b) sending position information of the avatar of said each terminal to said server;

(c) receiving position information of the avatar of each user from said server;

(d) determining the image quality for the avatar of each of said other users on the basis of the relationship between the position information of the avatar of each of said other users and the position information of the avatar of said each user;

(e) sending to said server a video request signal requesting a video image of said determined quality; and (f) generating an avatar image on the basis of the video image data of each of said other users received from said server and displaying it in a visual field image of said each user at the position specified by the position information of the avatar of each of said other users; and wherein said server performs the steps of:

(g) writing video image data received from each terminal in correspondence therewith;

(h) sending position information of the avatar of the user received from each terminal to all the other terminals; and (i) analyzing a video image request signal received from each of said other users, then reading out the requested video image data from said video memory means and sending it to the requesting terminal after processing it to have specified quality.

50. A display method for a virtual space which has a plurality of terminals interconnected via a communication network and sharing a predetermined common virtual space and generates and displays a visual field image which changes as an avatar representing a user of each terminal moves in said virtual space at said each terminal, said each terminal performing the steps of:

(a) picking up a video signal representing the video image of the user of said each terminal, digitally processing the video signal and writing it in video memory means;

(b) sending position information of the avatar of said each terminal to the other terminals;

(c) receiving position information of the avatar of the user of each of said other terminals;

(d) determining the image quality for the avatar of each of said other users on the basis of the relationship between the position information of the avatar of each of said other users and the position information of the avatar of said each user;

(e) sending to each of said other terminals a video request signal requesting a video image of said determined quality;

(f) receiving the video request signal from each of said other terminals;

(g) sending video data of a user read out of said video image memory to the requesting terminals after processing it to have quality specified by said video request signal; and (h) generating an avatar image on the basis of the video image data of each of said other users received therefrom and displaying it in a visual field image of said each user at the position specified by the position information of the avatar of each of said other users.

51. The method of claim 49 or 50, wherein said position information of said avatar includes its position coordinate and said step (d) includes a step of determining the image quality of each of said other users so that its image quality becomes lower with an increase in the length of a straight line joining the position coordinate of the avatar of the user of said each terminal and the position coordinate of the avatar of each of said other users in the field of vision of the former.

52. The method of claim 49 or 50, wherein the position information of said avatar includes its position coordinate and said step (d) includes a step of determining the image quality of each of said other users so that said image quality becomes lower with an increase in the angle between the direction of eyes of the avatar of the user of each terminal and the position of the avatar of each of said other users in the field of vision of the former.

53. The method of claim 49 or 50, wherein said position information of said avatar includes its position coordinate and direction of eyes and said step (d) includes a step of determining the image quality of each of said other users so that said image quality becomes lower with an increase in the sum of the angles of rotation of the directions of eyes of the avatar of the user of said each terminal and the avatar of each of said other users to a straight line joining their coordinates in the field of vision of the avatar of the user of said each terminal.

54. A display method for a virtual space which has a plurality of terminals connected to a server via a communication network and sharing a predetermined common virtual space and generates and displays a visual field image which changes as an avatar representing a user of each terminal moves in said virtual space at said each terminal, said each terminal performing the steps of:

(a) picking up video signal representing the video image of the user of said each terminal, digitally processing the video signal and sending the video image data of said user to said server;

(b) sending video image data of said each terminal and position information of its avatar to said server;

(c) receiving video image data of the other users and position information of their avatars from said server; and (d) generating an avatar image on the basis of the video image data of each of said other users received from said server and displaying it in a visual field image of said each user at the position specified by the position information of the avatar of each of said other users; and said server performing the steps of:

(e) storing video image data received from each terminal in correspondence therewith;

(f) sending position information of the avatar of the user received from each terminal to all the other terminals;

(g) determining the image quality for the avatar of the user of each of said other users on the basis of the relationship between the position information of the avatar of each user and the position information of the avatar of each of said other users; and (h) reading out the video image data of each of said other terminals from said video memory means and sending it to each of said other terminals after processing it to have said determined quality.

55. A display method for a virtual space which has a plurality of terminals interconnected via a communication network and sharing a predetermined common virtual space and generates and displays a visual field image which changes as an avatar representing a user of each terminal moves in said virtual space at said each terminal, said each terminal performing the steps of:

(a) picking up the video image of the user of said each terminal and writing the video signal in video memory means;

(b) sending position information of the avatar of said each terminal to the other terminals;

(c) receiving position information of the avatar of the user of each of said other terminals;

(d) determining the image quality for the avatar of each of said other users on the basis of the relationship between the position information of the avatar of each of said other users and the position information of the avatar of said each user;

(e) reading out the video image data of the user from said video memory and sending it to each of said other terminals after processing it to have said determined quality; and (f) generating an avatar image on the basis of the video image data of each of said other users received therefrom and displaying it in a visual field image of said each user at the position specified by the position information of the avatar of each of said other users.

56. The method of claim 54, wherein said position information of said avatar includes its position coordinate and direction of eyes and said image quality determining step includes a step of determining the image quality of each of said other users so that said image quality becomes lower with an increase in the length of a straight line respectively joining the position coordinate of the avatar of the user of said each terminal and the position coordinate of the avatar of each of said other users in the field of vision of the user of said each terminal.

57. The method of claim 55, wherein the position information of said avatar includes its position coordinate and direction of eyes and said image quality determining step includes a step of determining the image quality of each of said other users so that said image quality becomes lower with an increase in the length of a straight line joining the position coordinate of said each terminal and the position coordinate of the avatar of the user in the field of vision of said each terminal.

58. The method of claim 54, wherein the position information of said avatar includes its position coordinate and direction of eyes and said step (g) includes a step of determining the image quality of each of said other users so that said image quality becomes lower with an increase in the angle between the direction of eyes of said each terminal and the position of the avatar of each of said other terminals in the field of vision of said each terminal.

59. The method of claim 55, wherein the position information of said avatar includes its position coordinate and direction of eyes and said step (d) includes a step of determining the image quality of each of said other users so that said image quality becomes lower with an increase in the angle between the direction of eyes of said each terminal and the position of the avatar of each of said other terminals in the field of vision of said each terminal.

60. The method of claim 54, wherein said position information of said avatar includes its position coordinate and direction of eyes and said step (g) includes a step of determining the image quality of each of said other users so that said image quality becomes lower with an increase in the sum of the angles of rotation of the directions of eyes of the avatars of the avatar of the user of said each terminal and the avatar of each of said other users to a straight line joining their coordinates in the field of vision of the avatar of the user of said each terminal.

61. The method of claim 55, wherein said position information of said avatar includes its position coordinate and direction of eyes and said step (d) includes a step of determining the image quality of each of said other users so that said image quality becomes lower with an increase in the sum of the angles of rotation of the directions of eyes of the avatar of the user of said each terminal and the avatar of each of said other users to a straight line joining their coordinates in the field of vision of the avatar of the user of said each terminal.

* * * * *